United States Patent
Okazaki et al.

(10) Patent No.: US 7,892,309 B2
(45) Date of Patent: Feb. 22, 2011

(54) PRODUCTION METHOD OF HONEYCOMB FILTER AND HONEYCOMB FILTER

(75) Inventors: Shunji Okazaki, Yukuhashi (JP);
Yasuhiko Otsubo, Kitakyushu (JP);
Shinya Tokumaru, Kanda-machi (JP);
Hirohisa Suwabe, Minamikawachi-machi (JP); Toshitaka Ishizawa, Moka (JP)

(73) Assignee: Hitachi Metals, Ltd., Tokyo (JP)

( * ) Notice: Subject to any disclaimer, the term of this patent is extended or adjusted under 35 U.S.C. 154(b) by 110 days.

(21) Appl. No.: 11/722,537

(22) PCT Filed: Dec. 22, 2005

(86) PCT No.: PCT/JP2005/023684
§ 371 (c)(1),
(2), (4) Date: Jun. 22, 2007

(87) PCT Pub. No.: WO2006/068256
PCT Pub. Date: Jun. 29, 2006

(65) Prior Publication Data
US 2008/0155952 A1    Jul. 3, 2008

(30) Foreign Application Priority Data

Dec. 22, 2004 (JP) .............................. 2004-371959
Apr. 28, 2005 (JP) .............................. 2005-133549
Apr. 28, 2005 (JP) .............................. 2005-133550
May 31, 2005 (JP) .............................. 2005-158643
May 31, 2005 (JP) .............................. 2005-159263

(51) Int. Cl.
*B01D 24/00* (2006.01)
*B01D 39/06* (2006.01)
*B01D 39/14* (2006.01)
*B01D 50/00* (2006.01)

(52) U.S. Cl. .............................. 55/523; 55/522; 55/524; 422/169; 422/170; 422/171; 422/172; 422/177; 422/178; 422/179; 422/180; 422/181; 422/182

(58) Field of Classification Search ........... 55/522–524; 422/169–182
See application file for complete search history.

(56) References Cited

U.S. PATENT DOCUMENTS 3,900,546 A * 8/1975 Kaukeinen .................. 264/102

(Continued)

FOREIGN PATENT DOCUMENTS

CN          1448619 A      10/2003

(Continued)

OTHER PUBLICATIONS

Translation of JP10337427 Dec. 22, 1998.*

(Continued)

*Primary Examiner*—Walter D Griffin
*Assistant Examiner*—Amber Orlando
(74) *Attorney, Agent, or Firm*—Sughrue Mion, PLLC

(57) ABSTRACT

A method for producing a honeycomb filter from a honeycomb structure having large numbers of flow paths partitioned by cell walls, comprising inserting a tubular member into each of the flow paths, and injecting a plugging material into each of the flow paths from the tubular member to form a plug in each of the flow paths at a position separate from the end surface of the honeycomb structure, the tubular member having an outer diameter that is 40-90% of the opening size of the flow path, the plugging material comprising at least a ceramic material having a maximum particle size that is 85% or less of the inner diameter of the tubular member, and an average particle size of 1 μm or more.

13 Claims, 11 Drawing Sheets

U.S. PATENT DOCUMENTS

| | | | | |
|---|---|---|---|---|
| 4,329,162 | A * | 5/1982 | Pitcher, Jr. | 55/523 |
| 4,416,675 | A * | 11/1983 | Montierth | 55/502 |
| 4,417,908 | A * | 11/1983 | Pitcher, Jr. | 55/523 |
| 4,519,820 | A | 5/1985 | Oyobe et al. | |
| 4,704,863 | A * | 11/1987 | Abthoff et al. | 60/311 |
| 5,021,204 | A * | 6/1991 | Frost et al. | 264/630 |
| 5,259,190 | A * | 11/1993 | Bagley et al. | 60/300 |
| 5,498,288 | A | 3/1996 | Noky | |
| 5,766,393 | A | 6/1998 | Nishimura et al. | |
| 6,673,300 | B2 * | 1/2004 | Allen et al. | 264/400 |
| 6,699,428 | B2 * | 3/2004 | Nishi et al. | 264/630 |
| 6,776,814 | B2 * | 8/2004 | Badeau et al. | 55/385.3 |
| 7,033,452 | B2 * | 4/2006 | Yamada et al. | 156/89.22 |
| 7,107,763 | B2 * | 9/2006 | Suwabe et al. | 60/295 |
| 7,329,300 | B2 * | 2/2008 | Ichikawa | 55/523 |
| 7,488,368 | B2 * | 2/2009 | Yamada et al. | 55/523 |
| 2002/0020944 | A1 * | 2/2002 | Yamaguchi et al. | 264/400 |
| 2002/0189217 | A1 * | 12/2002 | Ishihara et al. | 55/523 |
| 2003/0093982 | A1 * | 5/2003 | Suwabe et al. | 55/523 |
| 2003/0161945 | A1 * | 8/2003 | Allen et al. | 427/230 |
| 2004/0018123 | A1 * | 1/2004 | Okawara et al. | 422/177 |
| 2004/0047774 | A1 | 3/2004 | Suwabe et al. | |
| 2004/0065068 | A1 * | 4/2004 | Otsubo et al. | 55/523 |
| 2004/0131772 | A1 * | 7/2004 | Yamada et al. | 427/230 |
| 2004/0206062 | A1 | 10/2004 | Ichikawa | |
| 2005/0175514 | A1 * | 8/2005 | Ohno | 422/177 |
| 2006/0185335 | A1 * | 8/2006 | Ichikawa | 55/523 |

FOREIGN PATENT DOCUMENTS

| | | |
|---|---|---|
| EP | 1 348 843 A2 | 10/2003 |
| JP | 59-028010 | 2/1984 |
| JP | 59-28010 A | 2/1984 |
| JP | 05-023507 | 2/1993 |
| JP | 06-039219 | 2/1994 |
| JP | 6-39219 A | 2/1994 |
| JP | 2004-321848 A | 11/1994 |
| JP | 09-019613 | 1/1997 |
| JP | 9-19613 A | 1/1997 |
| JP | 10-337427 | 12/1998 |
| JP | 10-337427 A | 12/1998 |
| JP | 2002-122015 | 4/2002 |
| JP | 2003-254035 | 9/2003 |
| JP | 2003-254035 A | 9/2003 |
| JP | 2004-019498 | 1/2004 |
| JP | 2004-113930 | 4/2004 |
| JP | 2004-113930 A | 4/2004 |
| JP | 2004-251266 | 9/2004 |
| JP | 2004-251266 A | 9/2004 |
| JP | 2004-255623 A | 9/2004 |
| JP | 2004-321848 | 11/2004 |
| JP | 2006-334452 A | 12/2006 |
| JP | 2006-334459 A | 12/2006 |
| WO | WO03093657 * | 11/2003 |
| WO | 2007/004594 A1 | 1/2007 |

OTHER PUBLICATIONS

Chinese Office Action corresponding to Chinese Patent Application No. 200580042827.8 dated Dec. 25, 2009.

* cited by examiner

PRODUCTION METHOD OF HONEYCOMB FILTER AND HONEYCOMB FILTER

FIELD OF THE INVENTION

The present invention relates to a method for producing a honeycomb filter suitable for apparatuses for cleaning exhaust gas from automobile engines, particularly for cleaning apparatuses for removing particulate matter from diesel engine exhaust gas, and a honeycomb filter produced by such a method.

BACKGROUND OF THE INVENTION

For environmental protection, honeycomb filters comprising ceramic honeycomb structures and plugs alternately sealing both inlet and outlet portions for removing carbon-based particulate matter from exhaust gas discharged from diesel engines have been finding wider use.

FIG. 12 shows the cross sectional of a conventional honeycomb filter. In a honeycomb filter 50, an exhaust gas containing particulate matter flows into flow paths 52 open at inlets 57, passes through porous ceramic cell walls 53, and exits from outlets 58 via the adjacent flow paths. The particulate matter contained in the exhaust gas is captured by pores (not shown) in the cell walls 53. When the particulate matter continues being captured in the honeycomb filter 50, the pores in the cell walls 53 are clogged, resulting in drastic decrease in capturing performance and increase in pressure loss, thereby lowering engine power. The accumulated particulate matter can be burned by an electric heater, a burner, microwaves, etc. to regenerate the honeycomb filter 50. However, because as high exhaust gas temperatures as burning PM are unlikely to be achieved under usual operating conditions of diesel engines, technologies for accelerating the oxidation of PM by catalytic materials carried by the honeycomb filter 50 to regenerate the honeycomb filter 50 have been investigated. For instance, honeycomb filters having catalysts comprising platinum-group metals and rare earth oxides such as cerium oxide, etc., which are integrally carried by high-specific-surface-area alumina, are being put to practical use. Using such catalyst-carrying honeycomb filters, combustion reactions can be accelerated by the catalysts to remove the accumulated PM.

Even if such catalyst-carrying honeycomb filters were used, however, catalysts would not be activated to burn PM off in a driving state providing low exhaust gas temperatures during traffic jam, etc. JP 2002-122015 A discloses a method for cleaning exhaust gas comprising presuming the amount of PM accumulated in a catalytic-material-carrying filter depending on the operating condition of a diesel engine, and injecting an unburned fuel into an upstream side of the filter to accelerate the oxidation reaction of the fuel on the catalytic material, thereby burning the accumulated PM. In such forced regeneration of the filter by the added fuel, the oxidation reaction of the fuel is fully activated in a downstream side where the fuel is in good contact with the catalytic material, but the catalyst is substantially at the exhaust gas temperature in the inlet-side end portion of the filter, resulting in always low activation. Accordingly, when driving conditions at low exhaust gas temperatures continue, PM is likely to be accumulated at the inlet-side end surface 57 where the catalytic material has low activity, particularly on the exhaust-gas-inlet-side end surfaces of the exhaust-gas-inlet-side plugs 54. As a result, the inlet-side the end surfaces of the inlet-side flow paths 52 in the filter are clogged, resulting in pressure loss increase.

To prevent pressure loss increase by the accumulation of PM at the exhaust-gas-inlet-side end surface of a catalyst-carrying honeycomb filter, particularly on the exhaust-gas-inlet-side end surfaces of exhaust-gas-inlet-side plugs, the applicant disclosed in JP 2004-251266 A, a honeycomb filter 80 shown in FIG. 15, and a method for cleaning an exhaust gas. The honeycomb filter 80 comprises has a catalytic material carried by at least part of porous ceramic cell walls and/or plugs of a honeycomb structure, at least one exhaust-gas-inlet-side plug 85 being separate form an exhaust-gas-inlet-side end surface 87. Because inlet-side end surfaces 85a, on which PM tends to be accumulated, are located in a high-temperature portion of in the honeycomb filter 80, the catalytic material carried by the inlet-side end surfaces 85a is activated in the forced regeneration of the filter by adding a fuel, so that PM is easily burned to prevent the clogging of the flow paths. Accordingly, the honeycomb filter does not suffer pressure loss increase for a long period of time.

JP 3-68210 B and JP 2004-19498 A disclose methods for producing honeycomb filters by forming plugs at positions separate from inlet-side end surfaces.

JP 3-68210 B discloses a first method shown in FIG. 13. As shown in FIG. 13(a), after the end surfaces of the flow paths not to be plugged are sealed by wax 66, the inlet end surface 67 of the honeycomb structure 61 is immersed in a plugging slurry 69 to introduce the slurry 69 into the flow paths 62 without wax. Because the honeycomb structure made of a porous ceramic absorbs water, an upper part of the slurry entering into the flow paths 62 is solidified by losing water to the cell walls, while a lower part of the slurry not in full contact with the water-absorbing cell walls is not solidified. This honeycomb structure is turned upside down as shown in FIG. 13(b), so that the slurry remaining in the flow paths spontaneously flows downward to the solidified slurry portion to form plugs 64. The positions of the inlet-side plugs are determined depending on the height of the slurry. Disclosed as a second method is a method of embedding ceramic chips in the honeycomb structure to form inlet-side plugs, and sintering them to integrally bond the plugs to the cell walls.

JP 2004-19498 A discloses a method of injecting a cordierite-composition paste containing an organic binder and water into a honeycomb structure at positions of 10 mm inside from an upstream-side end surface of the honeycomb structure by a paste injector (dispenser) comprising a pipe of the predetermined length, thereby alternately forming plugs.

As a method for forming plugs in a flow path end portion by supplying a plugging material by a nozzle, by which the plugs are not formed at positions separate from the inlet-side end surface, JP 5-23507 A discloses a method of injecting a plugging material into a flow path from a lower opening of a nozzle connected to a plugging material supplier in a relative movement of the honeycomb filter and the plugging material supplier, thereby forming plugs, and JP 6-39219 A discloses a method for injecting a plugging material from pluralities of nozzles to form plugs.

Referring to the methods described in JP 3-68210 B and JP 2004-19498 A, the inventors attempted the methods of forming plugs at positions separate from the end surfaces of the honeycomb structures, but failed to produce honeycomb filters because of the following problems.

In the first method disclosed in JP 3-68210 B, when the slurry 69 is charged into the flow paths 62, water is absorbed by the cell walls in both upper and lower portions of the slurry, resulting in solidification occurring simultaneously in the upper and lower portions. It is thus difficult to solidify only the upper portion of the slurry, so that the entire flow paths upstream of the inlet-side plugs are sealed by the solidified slurry. Accordingly, it is difficult to form plugs at positions separate from the inlet-side end surface.

In the second method disclosed in JP 3-68210 B, because it is difficult to provide the extrusion-molded honeycomb structure and the ceramic chips with completely the same properties such as a thermal expansion coefficient, etc., gaps are generated between the ceramic chips and the cell walls due to expansion and shrinkage by sintering, resulting in a lower particulate-matter-capturing effect, the detachment of the ceramic chip plugs from the cell walls, or the breakage of the cell walls by the ceramic chips.

In the method disclosed in JP 2004-19498 A, in which a paste is supplied to the upstream portion of the honeycomb structure inside the upstream-side end surface by a pipe-shaped injector, the pipe inserted into the flow path comes into contact with porous cell walls, resulting in the breakage of the cell walls in the flow path end portion. When the cell walls are broken, the particulate matter is not fully captured, resulting in lowered cleaning performance. Also, a cream-like ceramic powder paste is likely to clog the pipe, so that plugs cannot be formed at positions separate from the end surface.

Further, there is a problem that voids (cavities) are likely generated in the plugs. As compared with the formation of plugs in the flow path end portions, the formation of plugs in the flow paths at positions separate from the end surface is likely to generate voids, because more water in the paste is absorbed by the cell walls. Namely, when plugs are formed at the end surface, water in the paste absorbed by the cell walls moves only toward another end surface. On the other hand, when plugs are formed at positions separate from the end surface, water moves from the injected portion in the cell walls toward both end surfaces, so that much more water is absorbed. Such voids decrease the reliability of the plugs, and provide the plugs with apertures in an extreme case, failing to function as a filter. Such phenomenon is remarkable when plugs are formed, for instance, 10 mm or more separate from the end surface of the honeycomb structure.

The above phenomenon similarly occurs, even when plugs are formed at positions separate from the end surface by the method of forming plugs in the flow path end portions using the nozzle described in JP 5-23507 A and JP 6-39219 A.

In the honeycomb filter 80 described in JP 2004-251266 A, which was proposed by the inventors, when a large amount of PM is accumulated at the inlet-side end surface 85a in a low exhaust gas temperature state for a long period of time, even the forced regeneration of the filter by the injection of an unburned fuel and/or a hydrocarbon gas sometimes cannot fully elevate the temperature of the inlet-side end surface 85a, failing to make the catalyst fully active in the exhaust-gas-inlet-side plugs 85 and the upstream-side cell walls 82u, and resulting in pressure loss increase in the honeycomb filter by the remaining PM.

OBJECTS OF THE INVENTION

The present invention made in view of the above problems provides a method for surely forming plugs at positions separate from the end surface of a honeycomb filter. Particularly, it provides a method for forming plugs in flow paths at positions separate from the end surface without breaking cell walls, using a plugging material injector having a tubular member of the predetermined length. It further provides a method for forming plugs while avoiding clogging with a plugging material, and preventing voids from generating in plugs.

It also provides a honeycomb filter having plugs at positions separate from the inlet-side end surface, which could not be produced by conventional methods. It further provides a honeycomb from which PM is removed by forced regeneration to prevent pressure loss increase, thereby being stably usable for a long period of time, even when a large amount of PM is accumulated on inlet-side end surfaces 85a of exhaust-gas-inlet-side plugs 85 after a low exhaust gas temperature continues.

DISCLOSURE OF THE INVENTION

The method of the present invention for producing a honeycomb filter from a honeycomb structure having large numbers of flow paths partitioned by cell walls, comprising inserting a tubular member into each of the flow paths, and injecting a plugging material into each of the flow paths from the tubular member to form a plug in each of the flow paths at a position separate from the end surface of the honeycomb structure, the tubular member having an outer diameter that is 40-90% of the opening size of the flow path, the plugging material comprising at least a ceramic material having a maximum particle size that is 85% or less of the inner diameter of the tubular member, and an average particle size of 1 μm or more.

In the method of the present invention for producing a honeycomb filter, the plugging material preferably comprises at least a ceramic material, a liquid component, and an agglomeration-preventing agent.

In the method of the present invention for producing a honeycomb filter, the plugging material preferably comprises 100 parts by mass of the ceramic material, 10-70 parts by mass of the liquid component, and 0.01-10 parts by mass of the agglomeration-preventing agent.

In the method of the present invention for producing a honeycomb filter, the plugging material is preferably blended at pressure lower than the atmospheric pressure. After blending, the plugging material is preferably caused to pass through a sieve having openings of 200 μm or less.

In the method of the present invention for producing a honeycomb filter, after the plugging material is injected, the end surface of the honeycomb structure, through which the tubular member is inserted, is preferably machined. A reinforcer is preferably formed in at least part of cell walls in the flow path end portions of the honeycomb structure, into which the tubular member is inserted. More preferably, a guide having apertures, through which the tubular member can pass, is attached to the flow path end surface of the honeycomb structure, and the tubular member is inserted into the flow path.

In the method of the present invention for producing a honeycomb filter, the plugging material is preferably injected from the tubular member under pressure or fluidization, to form plugs. Also, while injecting the plugging material, the tubular member is moved substantially in a flow path direction.

In the method of the present invention for producing a honeycomb filter, the tubular member preferably has a rounded tip end or a tapered tip end. The tubular member is preferably made of stainless steel, cemented carbide, cermet or ceramics.

In the method of the present invention for producing a honeycomb filter, pluralities of tubular members are preferably arranged at the same interval as that of the flow paths to be plugged in the honeycomb structure.

In the method of the present invention for producing a honeycomb filter, the honeycomb structure is preferably made of at least one ceramic selected from the group consisting of cordierite, mullite, alumina, zirconia, silicon carbide, silicon nitride, aluminum nitride, titanium nitride, sialon, lithium aluminum silicate, and aluminum titanate.

In the method of the present invention for producing a honeycomb filter, the plugging material preferably comprises an organic foaming agent, and the organic foaming agent preferably comprises an unfoamed organic foaming agent.

In the method of the present invention for producing a honeycomb filter, it is preferable that a tubular member is inserted into each of the flow paths to inject a plugging material at one end of the honeycomb structure, thereby forming a plug in each of the flow paths at a position separate from one end surface of the honeycomb structure, and that the other end surface of the honeycomb structure is immersed in a second plugging material to form plugs in the other end portion of the honeycomb structure.

The method of the present invention for producing a honeycomb filter can provide a honeycomb filter comprising a honeycomb structure having large numbers of flow paths partitioned by cell walls, and at least plugs formed in pluralities of the flow paths at positions separate from the end surface of the honeycomb structure, the distance between the plugs and the end surface being not uniform.

In the honeycomb filter of the present invention, the distance between the plugs and the end surface preferably increases as going from a center portion to a peripheral portion in a cross section perpendicular to the flow path direction. Alternatively, the distance between the plugs and the end surface preferably decreases as going from a center portion to a peripheral portion in a cross section perpendicular to the flow path direction.

The method of the present invention for producing a honeycomb filter can provide a honeycomb filter comprising a honeycomb structure having large numbers of flow paths partitioned by cell walls, and at least plugs formed in the flow paths at positions separate from the end surface of the honeycomb structure, pluralities of plugs being formed in the same flow paths.

In the honeycomb filter of the present invention, the porosity of the cell walls is preferably 40-80%, and the porosity of the exhaust-gas-inlet-side plugs is preferably smaller than that of the cell walls. More preferably, the porosity of the cell walls is 50-80%.

In the honeycomb filter of the present invention, the porosity of the exhaust-gas-inlet-side plugs is preferably 0.5-0.9 times that of the cell walls, and the porosity of the exhaust-gas-outlet-side plugs is preferably larger than that of the cell walls. The porosity of the exhaust-gas-outlet-side plugs is preferably 90% or less, 1.1-1.5 times that of the cell walls.

In the honeycomb filter of the present invention, both end surfaces of the exhaust-gas-inlet-side plugs are preferably recessed.

In the honeycomb filter of the present invention, the depth of the recesses is preferably more than 50% of the opening diameter of the flow paths, and 50% or more of the porosity of the exhaust-gas-inlet-side plugs.

In the honeycomb filter of the present invention, a catalytic material is preferably carried by the cell walls and plugs of the porous ceramic honeycomb structure.

DESCRIPTION OF THE BEST MODE OF THE INVENTION

Figure 1:
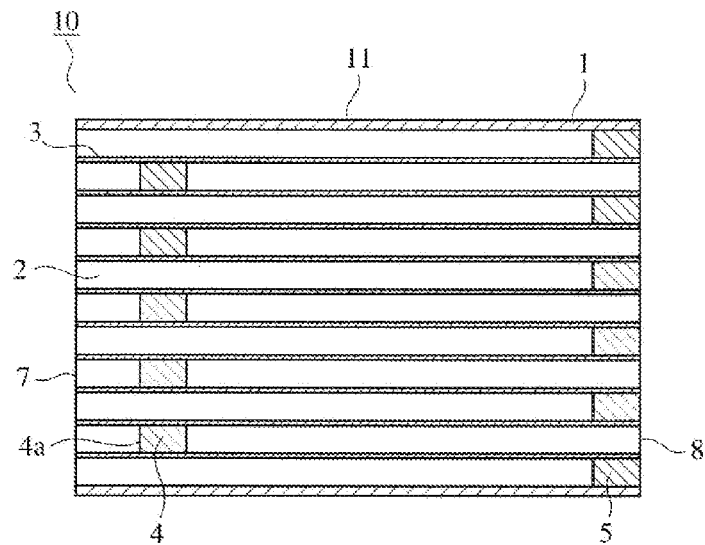
FIG. 1 is a schematic cross-sectional view showing one example of the honeycomb filter of the present invention.

[1] Production Method (1) Structure of Tubular Member

In the production method of the honeycomb filter, the outer diameter of the tubular member is 40-90% of the opening size of the flow path of the honeycomb structure. With the outer diameter in this range, the tubular member inserted into the flow path does not come into contact with the cell walls, thereby avoiding the breakage of the cell walls made of a porous material, while preventing the tubular member from being clogged with a plugging material. As a result, the plugs can be formed at desired positions.

The opening size of the flow path is the maximum diameter of a circle inscribed in a flow path cross section, which may be in any shape such as rectangle, square, hexagon, circle, etc. The cross section of the tubular member may be in any shape such as rectangle, square, hexagon, circle, etc., but it is preferably circular. When the tubular member has a polygonal cross section such as a rectangular, square or hexagonal cross section, corners of the tubular member coming into contact with the cell walls tend to damage the cell walls, and the plugging material tends to remain in the corners of the tubular member, easily causing clogging. The outer diameter of the tubular member is the maximum diameter of a cross section shape.

If the outer diameter of the tubular member were smaller than the opening size of the flow path, the cell walls would not be broken by the tubular member inserted into the flow path. However, the breakage of the cell walls actually occurs even when the outer diameter of the tubular member is slightly smaller than the opening size of the flow path. Investigation by the inventors has revealed that the breakage of the cell walls can be prevented when the outer diameter of the tubular member is 90% or less of the opening size of the flow path. On the other hand, when the outer diameter of the tubular member is less than 40%, the tubular member has a relatively small inner diameter, making it easy for the plugging material to clog the tubular member, and thus making it difficult to inject the plugging material. The more preferred outer diameter of the tubular member is 55-75% of the opening size of the flow path. The inner diameter/outer diameter ratio of the tubular member is preferably about 0.5-0.8, to secure that the tubular member has a desired thickness.

The tubular member preferably has a rounded tip end. As shown in FIG. 6(b), the tubular member 30 having a rounded tip end 31 is unlikely to break porous cell walls, because it is flexed when the tubular member inserted into the flow path comes into contact with the cell walls.

The tubular member preferably has a tapered tip end. As shown in FIG. 6(c), the tubular member 30 having a tapered tip end 32 is unlikely to break porous cell walls, because it is flexed when the tubular member inserted into the flow path comes into contact with the cell walls. Further, as shown in FIG. 6(d), the tubular member 30 having a rounded tip end 31 with a tapered portion 32 is more unlikely to break the cell walls.

The tubular member is preferably made of stainless steel, cemented carbide, cermet or ceramics, so that it is not broken when coming into contact with the cell walls, and that it is resistant to wear by the plugging material flowing therein. The ceramics may be alumina, zirconia, silicon carbide, silicon nitride, sialon, etc.

Pluralities of tubular members are preferably disposed at the same interval as that of the flow paths to be plugged in the honeycomb structure. The simultaneous injection of the plugging material into pluralities of flow paths to be plugged by pluralities of tubular members disposed at the same interval as that of the flow paths can shorten the plugging time.

(2) Formation of Plugs

By the honeycomb-filter-producing method of the present invention, the tubular member is inserted into the flow path of the honeycomb structure having large numbers of flow paths partitioned by cell walls to inject the plugging material, thereby forming plugs in the flow paths separate from the end surface of the honeycomb structure.

The formation of plugs is preferably conducted by injecting the plugging material in a pressurized or fluidized state from the tubular member into the flow path. The pressurized or fluidized plugging material is easily injected into the flow path in a predetermined amount. The injection of the plugging material can be conducted by a method of pressurizing a plugging-material-storing tank 21 through an air-supplying valve 22 to eject the plugging material through the tubular member 30 as shown in FIG. 2, or by a method of mechanically fluidizing the plugging material to eject it through the tubular member as shown in FIG. 3. In FIG. 2, a screw 92 is rotated in a cylinder 91, so that a plugging material moving through a gap 94 between the cylinder 91 and the screw 92 is sent to a tubular member 30 attached to a tip end surface 93 of the cylinder 91.

In the production method of the honeycomb filter, the tubular member is preferably moved while injecting the plugging material. Particularly, the tubular member is moved in the flow path direction to ensure the uniform injection of the plugging material into the flow path, thereby surely forming plugs at the desired positions.

(3) Formation of Second Plugs

In the production method of the honeycomb filter, the tubular member is preferably inserted into each of the flow paths to inject the plugging material thereinto, thereby forming plugs at positions separate from one end surface of the honeycomb structure, while the other end surface of the honeycomb structure is immersed in a second plugging material so that plugs are formed there.

In the formation of plugs at the end surface of the honeycomb structure, the number of plugging steps is preferably reduced by immersing the end surface of the honeycomb structure in the plugging material, rather than by inserting the tubular member into the flow path. The end surface of the honeycomb structure is preferably immersed in a second plugging material different from the plugging material injected by the tubular member. This second plugging material preferably comprises at least a ceramic material and a liquid component. Because it need not be as fluid as the plugging material injected by the tubular member, it may not contain an agglomeration-preventing agent.

The second plugging material preferably comprises a heat-resistant ceramic material, which may be at least one selected from the group consisting of cordierite, mullite, alumina, zirconia, silicon carbide, silicon nitride, aluminum nitride, titanium nitride, sialon, lithium aluminum silicate, aluminum titanate, etc. From the aspect of adhesion to the cell walls defining flow paths to be plugged, the second plugging material more preferably has the same composition as that of porous cell walls of the ceramic honeycomb structure. The liquid component may be a liquid imparting fluidity to the plugging material and evaporating under a proper condition, and it is preferably water. In addition, alcohols, glycerin, etc. may be used. If necessary, water-soluble binders and organic binders such as celluloses (methylcellulose, hydroxypropylcellulose, etc.) and polyvinyl alcohol, pore-forming agents, lubricants, etc. may be added.

In the production method of the honeycomb filter, plugs may be formed first in flow paths at positions separate from one end surface of the honeycomb structure by inserting the tubular member into the flow path and injecting the plugging material thereinto, and then in the other end surface of the honeycomb structure by immersing it in the second plugging material. Oppositely, plugs may be formed first in one end surface of the honeycomb structure by immersing it in the second plugging material, and then in flow paths at positions separate from the other end surface of the honeycomb structure by inserting the tubular member into the flow path and injecting the plugging material thereinto. The latter is more preferable. Because drying and sintering steps after the formation of plugs are conducted in large numbers, higher production efficiency is achieved by conducting the short step of immersing the end surface of the honeycomb structure in the plugging material to form plugs, before the step of inserting the tubular member into the flow path to form plugs.

(4) Post-Machining

In the production method of the honeycomb filter, after the plugging material is injected, the end surface of the honeycomb structure on the side of tubular member insertion is preferably machined. Although the honeycomb-filter-producing method of the present invention utilizes an optimized relation between the outer diameter of the tubular member and the opening size of the flow path, to avoid the breakage of the cell walls when the tubular member is inserted into the flow path, it is difficult to completely prevent the breakage of the cell walls. Even if the cell walls of the honeycomb structure are broken when the tubular member is inserted, broken portions can be removed by machining the end surface. This surely avoids decrease in regeneration performance and exhaust-gas-cleaning performance.

(5) Reinforcer

In the production method of the honeycomb filter, a reinforcer is preferably formed in at least part of cell walls in the flow path end portions of the honeycomb structure. The reinforcer 40 formed in the porous cell walls in the flow path end portions of the honeycomb structure as shown in FIG. 4(*a*) can prevent the cell walls from being broken, even if the tubular member inserted into the flow path is erroneously brought into contact with the cell walls.

Figure 4A:
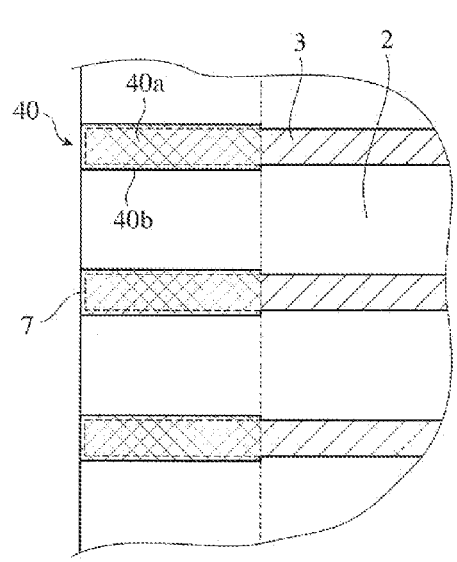
FIG. 4(a) is a cross-sectional view showing a reinforcer formed in cell walls of the flow path end portions.
Figure 4B:
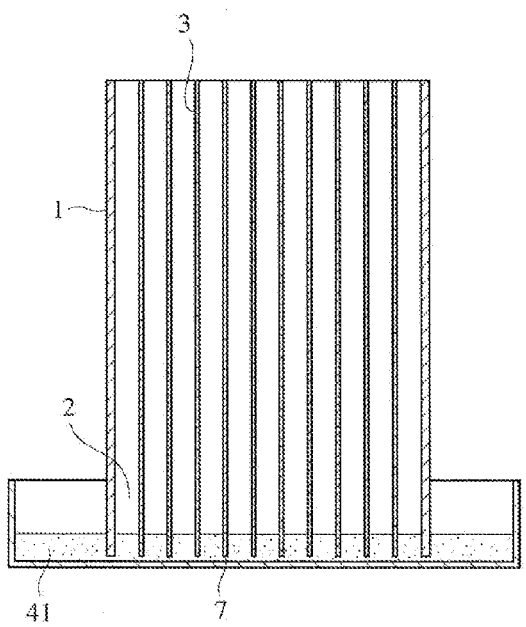
FIG. 4(b) is a view showing the method for forming a reinforcer.

The reinforcer 40, which comprises a portion 40*a* of a reinforcing material 41 impregnating the porous cell walls 3, and a portion 40*b* attached to the portion 40*a*, is formed by immersing the end portion of the honeycomb structure in a molten reinforcing material 41 as shown in FIG. 4(*b*). The reinforcer formed in the cell walls is preferably composed of a material easily removable after the formation of plugs, such as wax, etc.

(6) Guide

Figure 5:
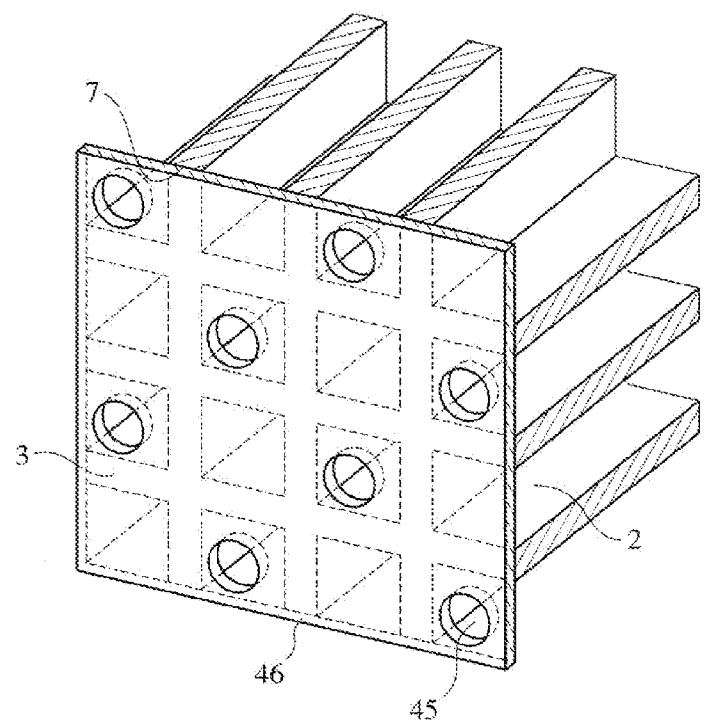
FIG. 5 is a perspective view showing a guide having apertures, which is attached to a flow path end surface.

In the production method of the honeycomb filter, a guide for inserting the tubular member is preferably attached to the flow path end surface of the honeycomb structure. With the guide 46 having apertures 45 permitting the tubular member to pass attached to the flow path end surface of the honeycomb structure as shown in FIG. 5, the tubular member inserted into the flow path through the guide is unlikely to come into contact with the cell walls, thereby avoiding the breakage of the cell walls. The guide permitting the tubular member to pass preferably has apertures larger than the outer diameter of the tubular member and smaller than the opening diameter of the flow path.

The apertures of the guide can be formed by reading the two-dimensional pattern of the flow path end surface of the honeycomb structure, determining the positions of openings by an image analysis method, etc., and boring by a laser, etc. The intervals between the flow paths of the honeycomb structure are not necessarily constant but have slight variations due to production errors. The above method preferably forms apertures at precise positions. Although the guide may be a film or plate of a resin, etc., which is provided with apertures, and then attached to the flow path end surface of the honeycomb structure, it is preferable to attach the film or plate of a resin, etc. to the flow path end surface of the honeycomb structure and then form apertures in the film or plate.

Figure 11:
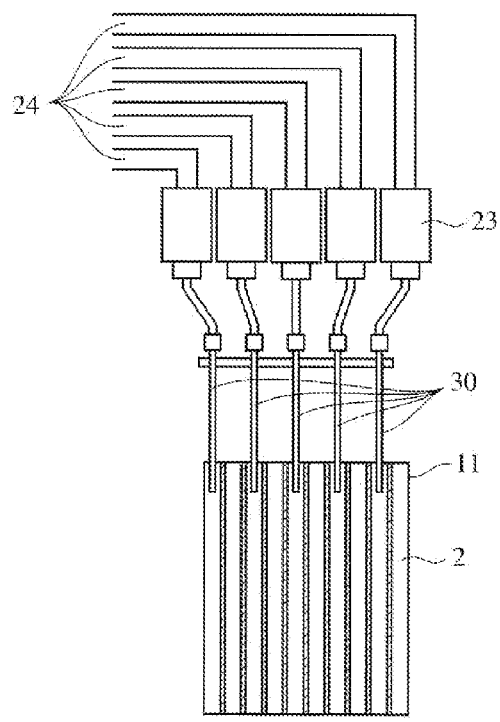
FIG. 11 is a schematic view showing a plugging-material-supplying apparatus comprising pluralities of tubular members.
Figure 12:
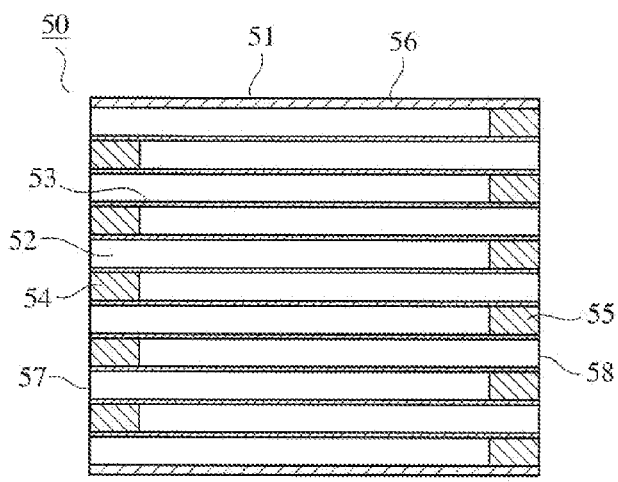
FIG. 12 is a schematic cross-sectional view showing a conventional honeycomb filter.
Figure 13A:
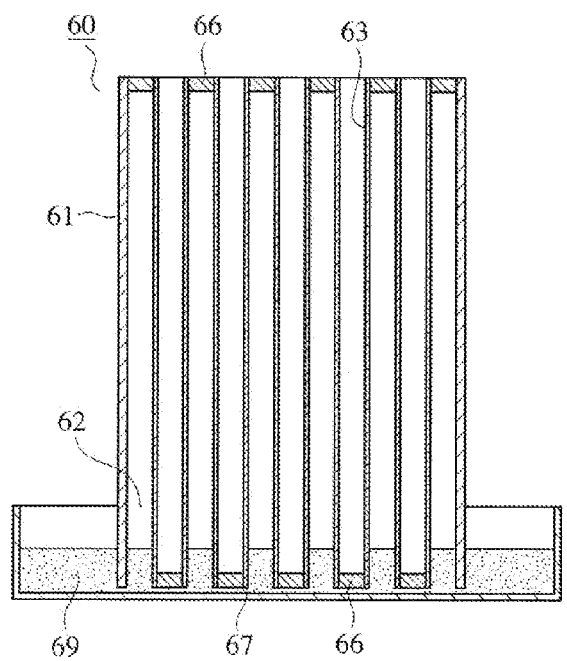
FIG. 13(a) is a view showing the plug-forming method described in JP 3-68210 B, in which a honeycomb structure is immersed in slurry.
Figure 13B:
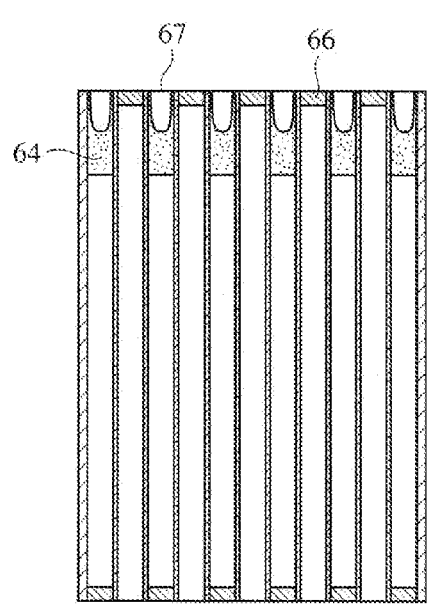
FIG. 13(b) is a view showing the plug-forming method described in JP 3-68210 B, in which the honeycomb structure is placed upside down to allow the slurry remaining in the flow paths to fall.
Figure 16:
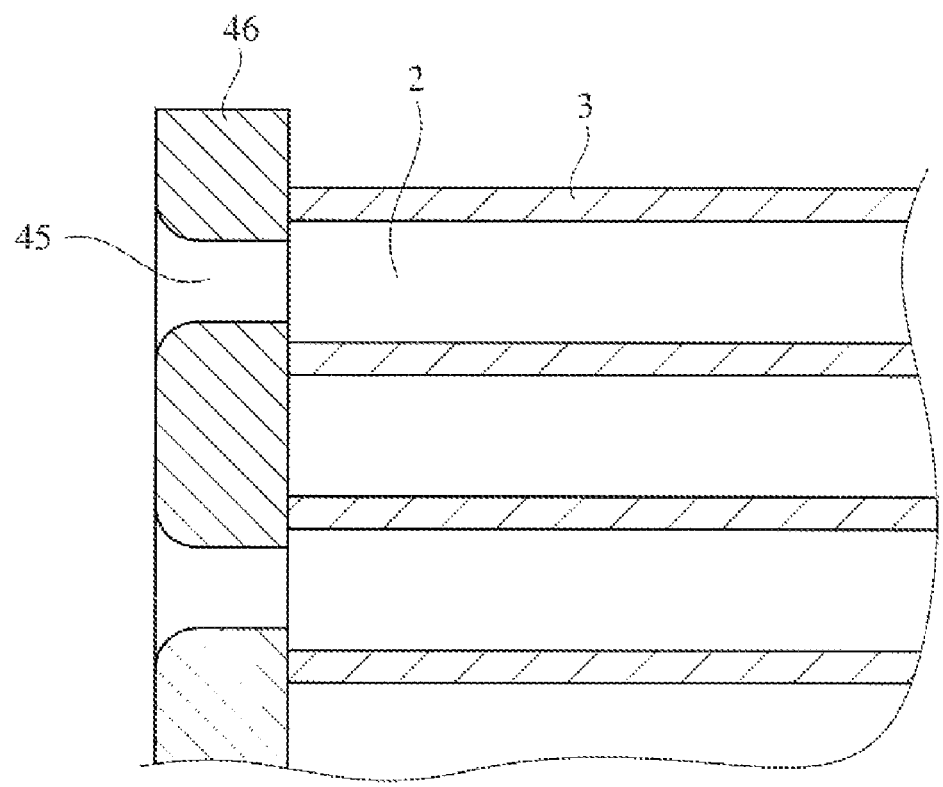
FIG. 16 is a cross-sectional view showing a guide having tapered apertures, which is attached to a flow path end surface.

To make the insertion of the tubular member easier, each aperture is preferably tapered with a wider opening on the tubular member inlet side as shown in FIG. 16. Particularly, when an apparatus comprising pluralities of tubular members as shown in FIG. 11 is used to inject the plugging material, the tapered openings effectively alleviate positioning precision.

Because the intervals between the flow paths of the honeycomb structure are not necessarily constant but have slight variations due to production errors, the plugging material is preferably injected, with the position of the tubular member corrected based on position information obtained at the time of forming the apertures. It is effective particularly when the plugging material is injected using an apparatus comprising pluralities of tubular members.

The thickness of the guide is preferably 0.5-10 mm, more preferably 1-5 mm. It is preferably a film of polyethylene, polypropylene, acrylics, olefins, etc.

[2] Materials (1) Plugging Material

Ceramic Material

The plugging material is preferably a heat-resistant ceramic material, particularly including at least one of cordierite, mullite, alumina, zirconia, silicon carbide, silicon nitride, aluminum nitride, titanium nitride, sialon, lithium aluminum silicate, aluminum titanate, etc. From the aspect of the adhesion to cell walls defining flow paths, it preferably has the same composition as that of the porous cell walls of the ceramic honeycomb structure.

The ceramic material has a maximum particle size of 85% or less of the inner diameter of the tubular member, and an average particle size of 1 μm or more. If the ceramic material contained in the plugging material had the maximum particle size smaller than the inner diameter of the tubular member, the ceramic material would not theoretically clog the tubular member. However, when the maximum particle size is slightly smaller than the inner diameter of the tubular member, the ceramic material actually clogs the tubular member. Investigation by the inventors has revealed that the clogging of the tubular member with the ceramic material can be prevented by controlling the particle size of the ceramic material such that the maximum particle size is 85% or less of the inner diameter of the tubular member. On the other hand, when the particle size of the ceramic material is less than 1 μm, the ceramic material has too large a specific surface area, needing a large amount of a liquid component for imparting fluidity to the plugging material, resulting in large shrinkage when the plugging material is dried, and thus forming voids.

The ceramic material more preferably has a maximum particle size of 70% or less of the inner diameter of the tubular member, and an average particle size of 2 μm or more.

Liquid Component

The liquid component entering between the ceramic material particles is added to impart fluidity to the plugging material. After injecting the plugging material into the flow path, the liquid component enters into the porous cell walls by a capillary phenomenon and evaporates in the plug-drying step, so that it does not remain in the plugs. Accordingly, it need only be a liquid capable of imparting fluidity to the plugging material and evaporating under a proper condition, and it is preferably water. In addition, alcohols, glycerin, etc. may be used alone or in combination.

Agglomeration-Preventing Agent

In the production method of the honeycomb filter, voids are likely to appear in plugs formed in flow paths at positions separate from the end surface, by the migration of the liquid component from the plugging material to the cell walls. The addition of the agglomeration-preventing agent suppresses the agglomeration of the ceramic material, and makes the ceramic material less movable in the migration of the liquid component, thereby preventing the generation of voids. As a result, the amount of the liquid component added can be reduced. Specific examples of the agglomeration-preventing agent include soda ash, water glass, polyacrylates, polycarboxylates, etc.

Amounts of Liquid Component and Agglomeration-Preventing Agent

The Amounts of the Liquid Component and the agglomeration-preventing agent in the plugging material used in the production method of the honeycomb filter are not particularly restricted, but the plugging material preferably contains 10-70 parts by mass of the liquid component and 0.01-10 parts by mass of the agglomeration-preventing agent, per 100 parts by mass of the ceramic material. When the amount of the liquid component exceeds 70 parts by mass, the plugging material shrinks too much when dried, resulting in undesirable voids. When the amount of the liquid component is less than 10% by mass, it is difficult to impart fluidity to the plugging material. The more preferred amount of the liquid component is 20-60% by mass. Too much or too little agglomeration-preventing agent increases the viscosity of the plugging material, resulting in lowered fluidity. The more preferred amount of the agglomeration-preventing agent is 0.1-5 parts by mass. The above formulation provides a plugging material with good fluidity without generating voids.

Other Additives

The plugging material used in the production method of the honeycomb filter may contain various additives to such an extent not to deteriorate the effect of the present invention, in addition to the ceramic material, the liquid component, and the agglomeration-preventing agent. Celluloses such as methylcellulose and hydroxypropylcellulose, water-soluble binders such as polyvinyl alcohol, organic binders, surfactants, lubricants, etc. may be added.

Preparation of Plugging Material

The plugging material is prepared by blending. After blending, the plugging material preferably passes through a sieve having openings of 200 μm or less. When foreign matter of 200 μm or more is contained in the plugging material, the tubular member is clogged with the plugging material, failing to enter into the flow paths. After blending, the plugging material preferably passes through a sieve having openings of 100 μm or less.

The plugging material is preferably blended at lower pressure than the atmospheric pressure to remove bubbles. When the plugging material ejected from the tubular member contains bubbles, it cannot be introduced into the flow paths in a desired amount, resulting in too short plugs. When the plugging material is injected from the tubular member under pressure, bubbles, if any, hinder pressure from applying to the plugging material, making it difficult to introduce the plugging material into the flow path. The lower pressure than the atmospheric pressure means pressure lower than the actual atmospheric pressure at a site that the plugging material is kneaded, which is not restricted to the standard atmospheric pressure (101.3 kPa) variable depending on the height above the sea level and latitude, but preferably 80 kPa or less.

In the production method of the honeycomb filter, the plugging material preferably contains an unfoamed organic foaming agent. The unfoamed organic foaming agent contained in the plugging material is foamed after the plugs are formed, expanding the plugging material so that its adhesion to the cell walls is improved, thereby achieving the strong adhesion of the plugging material to the cell walls.

(2) Honeycomb Structure

The honeycomb structure is preferably made of ceramics having at least one component selected from the group consisting of alumina, zirconia, cordierite, mullite, silicon carbide, titanium carbide, silicon nitride, sialon, titanium nitride, aluminum nitride, lithium aluminum silicate, and aluminum titanate. When the amount of particulate matter captured in the honeycomb filter becomes a certain level or more, the particulate matter is burned to regenerate the honeycomb filter. Accordingly, the honeycomb filter made of these heat-resistant ceramics is not subjected to damage such as melting, etc. during the regeneration. The honeycomb structure can be produced, for instance, by using cordierite-forming material powder containing 48-52% by mass of $SiO_2$, 33-37% by mass of $Al_2O_3$, and 12-15% by mass of MgO, which is prepared from kaolin powder, talc powder, silica powder and alumina powder.

Particularly in the case of a large honeycomb filter having an outer diameter of 150 mm and a length of 150 mm or more, which is required to have heat shock resistance, ceramics having low thermal expansion coefficients such as cordierite, aluminum titanate, LAS, etc. are preferable. Also, when a large amount of particulate matter captured is to be burned, ultra-high-heat-resistant ceramics such as silicon carbide, silicon nitride, etc. are preferable. These ceramics may be properly combined, and may contain sintering aids, etc.

After formed into a honeycomb, dried and sintered, the plugging material may be introduced into the flow paths to form a ceramic honeycomb structure. Alternatively, the formed or dried honeycomb before sintering may be used to introduce the plugging material into the flow paths.

[3] Structure of Honeycomb Filter (1) Overall Structure

In the case of having a cylindrical peripheral wall, the honeycomb filter of the present invention preferably has an outer diameter of 150-320 mm, with cell walls defining the flow paths having a thickness of 0.1-0.5 mm, a pitch of 1.0-3.0 mm, and an average pore size of 10-40 μm.

As a porous body, the cell walls as thin as less than 0.1 mm undesirably provide the honeycomb filter with insufficient strength. When the cell walls are thicker than 0.5 mm, the cell walls have large resistance for the exhaust gas to pass, resulting in large pressure loss. The more preferred cell wall thickness is 0.2-0.4 mm. When the cell wall pitch is less than 1.0 mm, each flow path of the honeycomb filter has a small opening area, there is undesirably large pressure loss when the exhaust gas flows through the flow path. When the cell wall pitch is larger than 3.0 mm, the honeycomb filter is likely to have a small surface area per a unit volume, resulting in a large pressure loss. The more preferred cell wall pitch is 1.2-2.0 mm.

When the average pore size of the cell walls is less than 10 μm, the honeycomb filter has a large pressure loss, resulting in decrease in the engine power. On the other hand, when the average pore size exceeds 40 μm, the strength of the cell walls decreases, the cell walls are likely broken by heat shock or mechanical vibration during use, and the PM-capturing efficiency is lowered.

(2) Porosity of Cell Walls and Plugs

In the honeycomb filter, the porosity of the cell walls is preferably 40-80%, and the porosity of the exhaust-gas-inlet-side plugs 4 is preferably smaller than that of the cell walls. With the inlet-side plugs 4 having a smaller porosity than that of the cell walls, the exhaust gas does not easily pass through the inlet-side plugs 4, thereby reducing the accumulation of PM on the inlet-side end surfaces 4a of the inlet-side plugs 4 that lowers the activity of the catalyst. Accordingly, the accumulated PM can be well burned in the forced regeneration of the filter. When the porosity of the cell walls is less than 40%, the honeycomb filter has an increased pressure loss, resulting in decrease in the engine power. When the porosity of the cell walls exceeds 80%, the strength of the cell walls decreases, and the PM-capturing efficiency also decreases. The more preferred porosity of the cell walls is 50-80%.

In the honeycomb filter of the present invention, the porosity of the exhaust-gas-inlet-side plugs 4 is preferably 0.5-0.9 times the porosity of the cell walls, so that the amount of PM accumulated on the inlet-side end surfaces of the inlet-side plugs 4 can be surely reduced, while having enough heat shock resistance between the plugs 4 and the cell walls. When the porosity of the exhaust-gas-inlet-side plugs 4 is less than 0.5 times the porosity of the cell walls, there is a large heat capacity difference between the inlet-side plugs and the cell walls, resulting in cracking between them. The porosity of the plugs 4 exceeding 0.9 times the porosity of the cell walls has less effect of reducing the amount of PM accumulated on the inlet-side end surfaces of the plugs 4, resulting in increase in the pressure loss of the honeycomb filter. The more preferred porosity of the plugs is 0.6-0.8 times the porosity of the cell walls.

In the honeycomb filter of the present invention, the porosity of the exhaust-gas-outlet-side plugs 5 is 90% or less, and 1.1-1.5 times the porosity of the cell walls, so that the exhaust gas exhaust gas can surely pass through the outlet-side plugs to further reduce the pressure loss of the honeycomb filter. When the porosity of the exhaust-gas-outlet-side plugs 5 exceeds 90%, the exhaust-gas-outlet-side plugs have so reduced strength that they become easily broken. When the porosity of the exhaust-gas-outlet-side plugs 5 is less than 1.1 times the porosity of the cell walls, there is no sufficient effect of reducing pressure loss in the outlet-side plugs 5. When it exceeds 1.5 times, the exhaust-gas-outlet-side plugs have so reduced strength that they become easily broken. The more preferred porosity of the exhaust-gas-outlet-side plugs 5 is 1.2-1.4 times the porosity of the cell walls.

(3) Structure of Plug

In the honeycomb filter of the present invention, both end surfaces of the exhaust-gas-inlet-side plugs are preferably recessed. The depth of each recess is preferably larger than 50% of the opening diameter of each flow path.

Figure 17A:
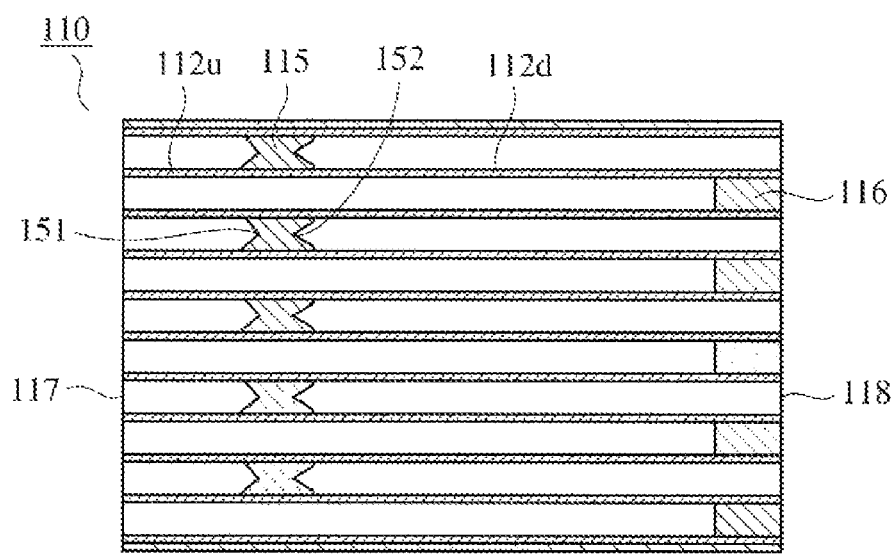
FIG. 17(a) is a schematic cross-sectional view showing the honeycomb filter of the present invention, in which both end surfaces of plugs are recessed.

In the honeycomb filter of the present invention 110 shown in FIG. 17(a), with recesses provided on both end surfaces 151 and 152 of the exhaust-gas-inlet-side plugs 115, combustion heat generated in the cell walls 112u and on inlet-side end surfaces 151 of the exhaust-gas-inlet-side plugs 115 by an unburned fuel and/or a hydrocarbon gas injected into the upstream side of the filter is easily transmitted to the exhaust-gas-outlet-side end surfaces 152, thereby reducing thermal stress generated by temperature difference between the inlet-side end surfaces 151 and the outlet-side end surfaces 152. It is thus possible to surely avoid breakage due to heat shock in the inlet-side plugs, in boundaries between the inlet-side plugs and the cell walls, and in the cell walls near the inlet-side plugs.

The honeycomb filter having recesses on both end surfaces of the inlet-side plugs 115 has enough contact area between the inlet-side plugs and the cell walls, with a small temperature difference between the inlet-side end surface 151 and the outlet-side end surface 152. As a result, the inlet-side plugs 115 and the cell walls are surely bonded together to prevent breakage by heat shock.

Figure 17B:
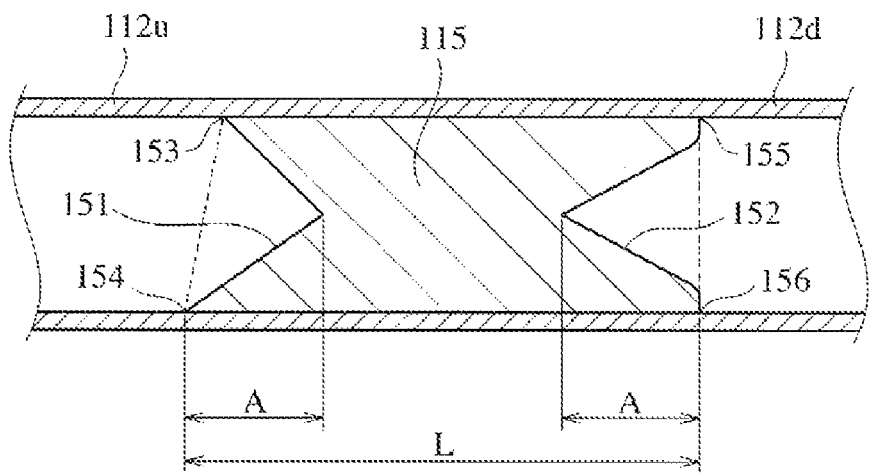
FIG. 17(b) is an enlarged view showing a plug.

As shown in FIG. 17(b), in the recesses formed on both end surfaces of the inlet-side plugs 115, the end surfaces need only be recessed in the flow path direction relative to a hypothetical straight line connecting contact points 153 and 154 or 155 and 156 of the plugs and the cell walls. The inlet-side end surfaces 151 and the outlet-side end surface 152 need not have substantially the same shape, but may have different shapes as shown in FIG. 17(b). The recesses formed on both end surfaces of the inlet-side plugs 115 are not restricted to the shapes shown in FIGS. 17(a) and 17(b).

The inlet-side plugs 115 are preferably as thick as 8-30 mm. The thickness of the inlet-side plug means the maximum distance between the contact point of the inlet-side end surface of the inlet-side plug and the cell wall and the contact point of the outlet-side end surface and the cell wall. In FIG. 17(b), for instance, it is the distance L between the contact point 154 and the contact point 156. The more preferred thickness L of the inlet-side plug is 10-20 mm.

In the honeycomb filter of the present invention, the exhaust-gas-inlet-side plugs 115 are preferably positioned in such a region that the distance of their exhaust-gas-inlet-side end surfaces 151 from the exhaust-gas-inlet-side end surface 117 of the honeycomb filter is 0.7 times or less the length of the honeycomb filter. The position of the inlet-side end surface 151 of the inlet-side plug 115 is a contact point of the inlet-side end surface 151 and the cell wall 112.

To ensure temperature elevation in the cell walls 112u upstream of the exhaust-gas-inlet-side plugs 4 when an unburned fuel and/or a hydrocarbon gas are injected into the upstream side of the honeycomb filter, the exhaust-gas-inlet-side plugs 115 are preferably 10 mm or more separate from the inlet-side end surface 117. The more preferred distance of the end surface 151 of the inlet-side plug from the inlet-side end surface 117 of the honeycomb filter is 0.25-0.45 times the length of the honeycomb filter.

In the honeycomb filter of the present invention, the depth of each recess is preferably more than 50% of the opening diameter of the flow path. When the depth A of each recess is more than 50% of the opening diameter in FIG. 17(b), a combustion heat is well transmitted from the exhaust-gas-the inlet-side end surfaces 151 of the inlet-side plugs 115 to the outlet-side end surfaces 152, resulting in decrease in thermal stress generated by the temperature difference between the inlet-side end surfaces 151 and the outlet-side end surfaces 152. Accordingly, breakage due to heat shock can be surely prevented in the inlet-side plugs, boundaries between the inlet-side plugs and the cell walls, and the cell walls near the inlet-side plugs.

(4) Flow Paths without Plugs

In the honeycomb filter of the present invention, the percentage of flow paths without plugs is preferably 0.03-1.5% of those having plugs on the exhaust-gas-inlet-side and the exhaust-gas-outlet-side. With 0.03% or more of the flow paths 9b free from plugs in FIG. 18, breakage due to thermal stress between the plugs and the cell walls, which is generated by thermal expansion and thermal shrinkage during the burning of PM and regeneration of the filter can be prevented. When the percentage of the plug-free flow paths exceeds 1.5%, the PM-capturing efficiency decreases. The more preferred percentage of the plug-free flow paths is 0.04-0.8%.

In the honeycomb filter of the present invention, the plug-free flow paths are preferably not adjacent to each other. The plug-free flow paths may be those having plugs with penetrating apertures substantially in their centers. With this structure, the pressure loss is suppressed while keeping high PM-capturing efficiency.

(5) Other Shapes of Honeycomb Filter

Figure 7:
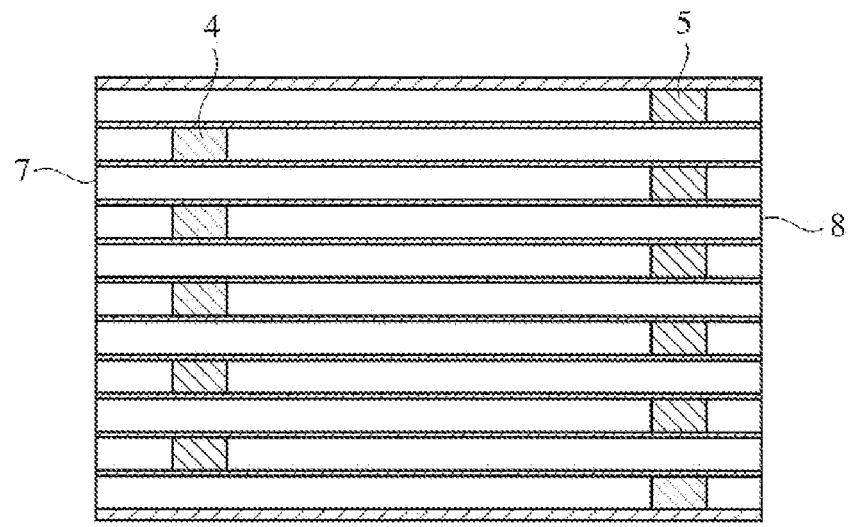
FIG. 7 is a schematic cross-sectional view showing one example of the honeycomb filter of the present invention.
Figure 8:
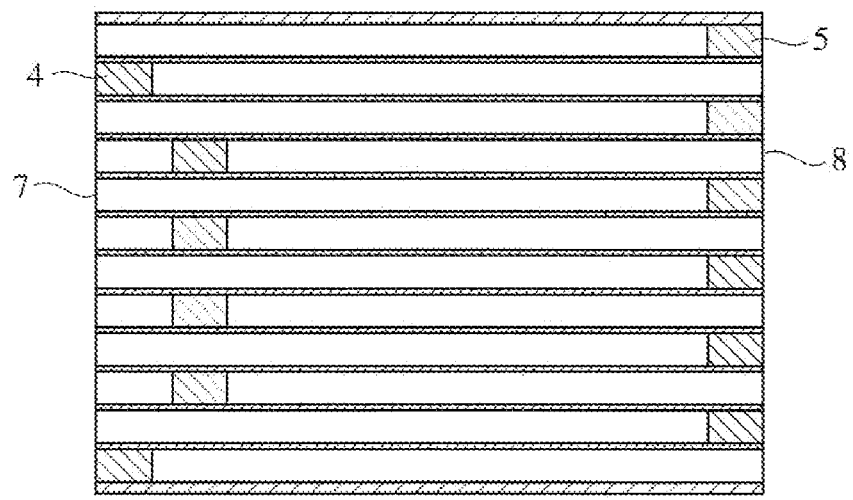
FIG. 8 is a schematic cross-sectional view showing one example of the honeycomb filter of the present invention.

Although the production method of the honeycomb filter of the present invention has been explained referring to an example in which plugs on one side are receding from the end surface, the present invention is also applicable to a honeycomb filter with plugs on both inlet and outlet sides separate from the end surfaces as shown in FIG. 7, and a honeycomb filter with part of plugs disposed at the end surface as shown in FIG. 8.

According to the production method of the honeycomb filter, the distance of the plugs from the end surface can be arbitrarily set by adjusting the length and inserting position of the tubular member. As shown in FIGS. 9(a)-9(f), for instance, various shapes of honeycomb filters with non-uniform distance between plugs and end surfaces can be produced. In these honeycomb filters, boundaries between the plugs and the cell walls, in which stress by heat shock and combustion heat are concentrated, are not aligned straight, thereby preventing breakage by heat shock and melting. Further, the space upstream of the inlet-side plugs makes the regeneration of the filter easy.

In the honeycomb filter, a catalytic material is preferably carried on the porous cell wall surfaces and in the pores, to easily conduct the combustion of particulate matter in the regeneration of the filter. The preferred catalytic materials are preferably oxidation catalysts containing platinum-group metals, etc. The catalytic material may be carried in the entire honeycomb filter, or may be carried mainly by cell walls upstream of the inlet-side plugs formed in the flow paths. The oxidizing activity of the oxidation catalyst may be different between the exhaust gas inlet side and the exhaust gas outlet side with the inlet-side plugs as boundaries.

Figure 9A:
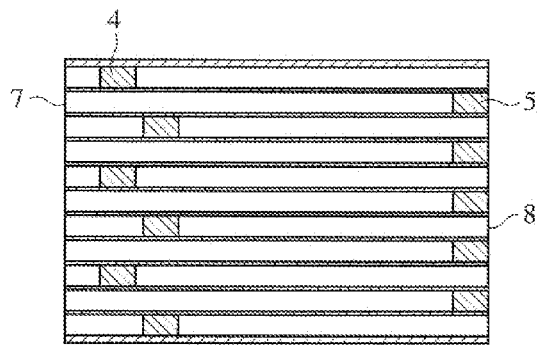
FIG. 9 is a schematic cross-sectional view showing an example of the honeycomb filter of the present invention, in which plugs are not aligned straight.
Figure 9B:
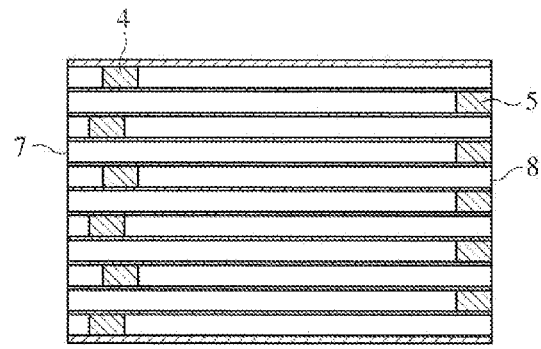
Figure 9C:
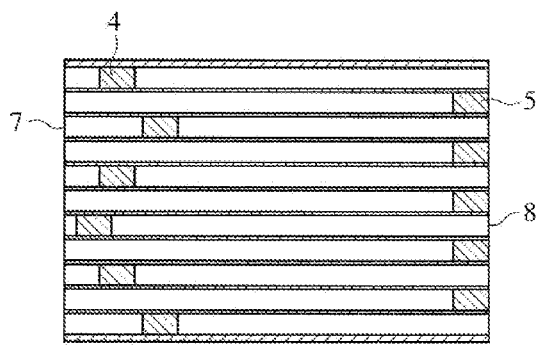
Figure 9D:
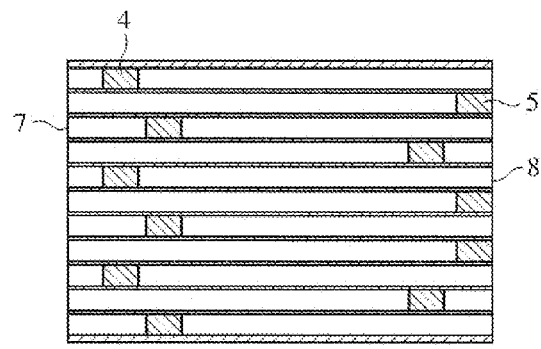
Figure 9E:
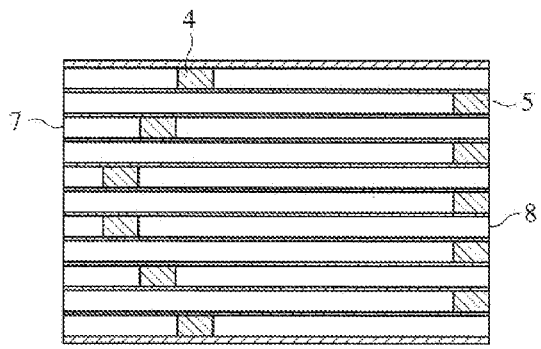

In the honeycomb filter of the present invention shown in FIG. 9(e), the distance between the plugs and the end surface gradually increases as going from a center in a cross section perpendicular to the flow path direction to a periphery. The temperature of the honeycomb filter is higher in the center portion than in the peripheral portion during continuous regeneration. Accordingly, when the oxidation catalyst is carried in an amount corresponding to a temperature distribution by cell walls upstream of the inlet-side plugs 4 of the honeycomb filter as shown in FIG. 9(e), the total amount of the expensive oxidation catalyst can be made smaller than when it is carried by a honeycomb filter having inlet-side plugs at an equal distance from the end surface. Also, because the exhaust gas flow is directed toward the periphery, a regeneration load is not concentrated in the center portion of the honeycomb filter after capturing particulate matter but scattered throughout the entire honeycomb filter, making it easy to conduct regeneration in the entire honeycomb filter.

Figure 9F:
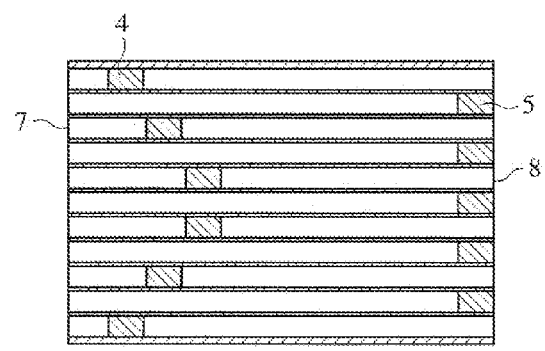

In the honeycomb filter shown in FIG. 9(f), the distance between the plugs and the end surface decreases as going from the center portion to the peripheral portion in a cross section perpendicular to the flow path direction. When the oxidation catalyst is carried by cell walls upstream of the inlet-side plugs 4 of such honeycomb filter, more particulate matter is captured in the center portion having a higher gas flow rate than in the peripheral portion, so that the amount of the oxidation catalyst carried is in parallel with the amount of particulate matter captured during the forced regeneration. Accordingly, the total amount of the expensive oxidation catalyst can be made smaller than in a honeycomb filter having plugs at an equal position from the end surface.

The honeycomb filters shown in FIGS. 9(e) and 9(f) can be properly selected depending on engines, catalyst performance and control methods, thereby reducing the amount of an expensive oxidation catalyst carried, and making the filter smaller.

Figure 10A:
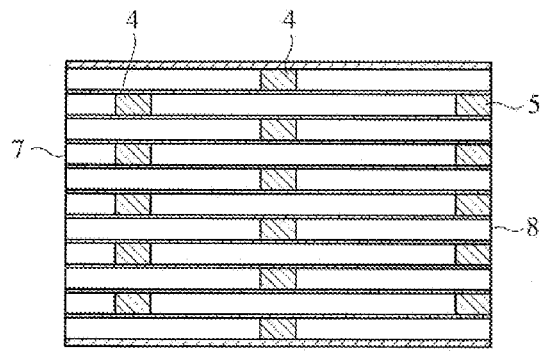
FIG. 10 is a schematic cross-sectional view showing structural examples of the honeycomb filter of the present invention, which has two plugs in one flow path.
Figure 10B:
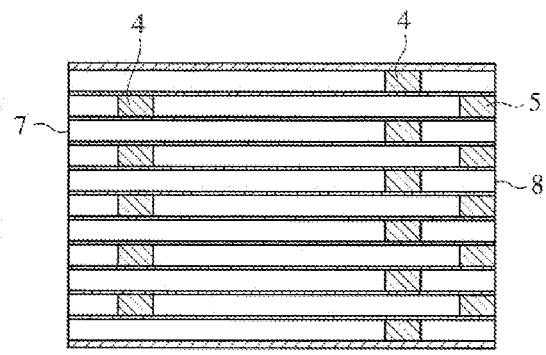

The method of the present invention can produce a honeycomb filter having pluralities of plugs in the same flow paths. In the honeycomb filter shown in FIG. 10, for instance, an exhaust gas passes through cell walls pluralities of times, resulting in excellent efficiency of capturing particulate matter in the exhaust gas.

The present invention will be explained in more detail with reference to Examples below without intention of restricting the scope of the present invention.

EXAMPLE 1

Kaolin powder, talc powder, silica powder, aluminum hydroxide powder and alumina powder were mixed at proportions of 50% by mass of $SiO_2$, 35% by mass of $Al_2O_3$, and 15% by mass of MgO, and methylcellulose and hydroxypropylmethylcellulose as binders, and graphite as a lubricant/pore-forming agent were added. After fully dry-blending, a predetermined amount of water was added to conduct sufficient blending, thereby producing a plasticized, moldable ceramic material. The moldable material was extruded through an extrusion die, and cut to form an extrudate having a honeycomb shape. This extrudate was dried and sintered to provide a cordierite honeycomb structure 11 of 280 mm in outer diameter and 310 mm in length shown in FIG. 2(a), whose cell walls had a thickness of 0.3 mm, a porosity of 65%, an average pore size of 20 μm, and a pitch of 1.5 mm.

Figures 2A, 2B:
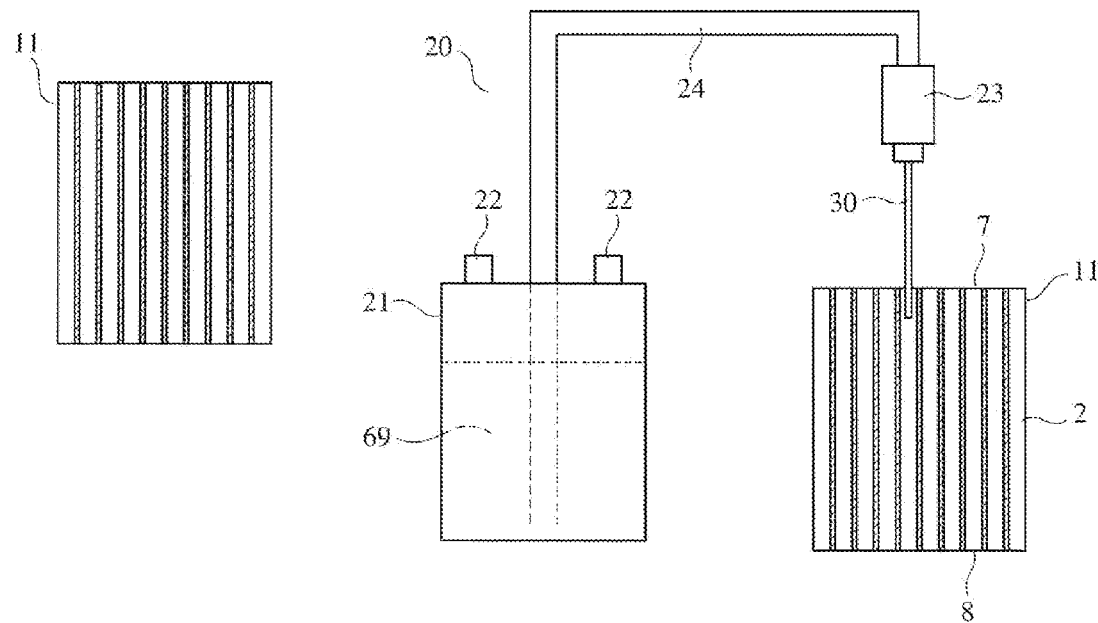
FIG. 2(a) is a cross-sectional view showing a honeycomb structure.
FIG. 2(b) is a schematic view showing a plugging-material-supplying apparatus for injecting a plugging material under pressure.
Figure 3:
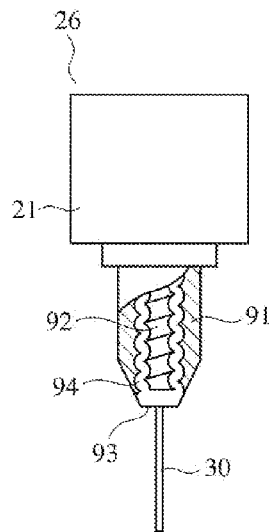
FIG. 3 is a schematic view showing a mechanical plugging-material-supplying apparatus for mechanically injecting a fluidized plugging material.

As shown in FIG. 2(b), the honeycomb structure 11 was placed near a plugging-material-supplying apparatus 20 comprising a plugging material tank 21, a tube 24 for supplying a plugging material from the tank 21 to the tubular member 30, and a valve 23, such that the flow path direction is substantially aligned with the gravity direction. The tubular member for supplying the plugging material was made of stainless steel and had a circular cross section having a length of 100 mm, an outer diameter of 0.5 mm and an inner diameter of 0.3 mm. A plugging ceramic material was produced by blending 100 parts by mass of cordierite powder an average particle size of 16 μm and a maximum particle size of 270 μm with 30 parts by mass of water, and filled in the plugging material tank 21.

The tubular member 30 was inserted into a flow path to be plugged to a position of 20 mm from the end surface 7 of the honeycomb structure 11, and the plugging material tank 21 was pressurized by air supplied through an air-supplying valve 22 to inject a predetermined amount of the plugging material into the flow path through the tubular member for plugging. The tubular member was withdrawn from the flow path, and plugging was conducted to other flow paths. The resultant honeycomb structure was then placed upside down, and a predetermined amount of the plugging material was injected from the tubular member 30 into a flow path to be plugged on another end surface 8 for plugging. The resultant plugs were dried and sintered to provide the honeycomb filter 10 shown in FIG. 1. The honeycomb filter 10 had large numbers of square-cross-sectioned flow paths 2 partitioned by cell walls 3 inside a peripheral wall 1, the flow paths 2 being sealed by plugs 4 or 5, and the plugs 4 being disposed in the flow paths at positions separate from the inlet-side end surface 7.

In the production method of the honeycomb filter of Example 1, the tubular member for plugging had an outer diameter of 0.5 mm, 42% of the opening size (1.2 mm) of each flow path in the honeycomb structure whose cell walls had a pitch of 1.5 mm and a thickness of 0.3 mm. Accordingly, when the tubular member was inserted into the flow path, it did not come into contact with the cell walls, thereby providing a honeycomb filter with plugs at positions separate from the end surface without breaking the cell walls.

EXAMPLE 2

Like in Example 1, a honeycomb structure 11 was placed near the plugging-material-supplying apparatus 20 such that the flow path direction was substantially aligned with the gravity direction. The tubular member for supplying the plugging material was made of stainless steel and had a circular cross section having a length of 100 mm, an outer diameter of 1.1 mm and an inner diameter of 0.8 mm. A plugging ceramic material was produced by blending 100 parts by mass of cordierite powder an average particle size of 25 μm and a maximum particle size of 500 μm with 30 parts by mass of water, and filled in the plugging material tank 21.

The tubular member 30 was inserted into a flow path to be plugged to a position of 30 mm from the end surface 7 of the honeycomb structure 11, and the plugging material tank 21 was pressurized by air supplied through an air-supplying valve 22 to inject a predetermined amount of the plugging material into the flow path through the tubular member for plugging. The tubular member was withdrawn from the flow path, and plugging was conducted to other flow paths. The resultant honeycomb structure was then placed upside down, and a predetermined amount of the plugging material was injected from the tubular member 30 into a flow path to be plugged on another end surface 8 for plugging. The resultant plugs were dried and sintered to provide the honeycomb filter 10.

In the production method of the honeycomb filter of Example 2, the cordierite powder as a ceramic material had a maximum particle size of 500 μm, 85% or less of the inner diameter (0.8 mm) of the tubular member, and an average particle size of 1 μm or more. Thus, a honeycomb filter with good plugs formed at positions separate from the flow path end surface was produced without clogging the tubular member with the ceramic material.

EXAMPLE 3

Like in Example 1, an end surface of a honeycomb structure 11 was placed in a plugging-material-supplying apparatus 20 such that the flow path direction was substantially aligned with the gravity direction. A tubular member for supplying the plugging material was made of stainless steel and had a circular cross section having a length of 100 mm, an outer diameter of 1.1 mm and an inner diameter of 0.8 mm. A plugging ceramic material was produced by blending 100 parts by mass of cordierite powder an average particle size of 30 μm and a maximum particle size of 700 μm, with 30 parts by mass of water and 2 parts by mass of ammonium polycarbonate as an agglomeration-preventing agent, and filled in the plugging material tank 21.

The tubular member 30 was inserted into a flow path to be plugged to a position of 20 mm from the end surface 7 of the honeycomb structure 11, and the plugging material tank 21 was pressurized by air supplied through an air-supplying valve 22 to inject a predetermined amount of the plugging material into the flow path through the tubular member for plugging. The tubular member was withdrawn from the flow path, and plugging was conducted to other flow paths. The resultant honeycomb structure was then placed upside down, and a predetermined amount of the plugging material was injected from the tubular member 30 into a flow path to be plugged on another end surface 8 for plugging. The resultant plugs were dried and sintered to provide the honeycomb filter 10.

In the production method of the honeycomb filter of Example 3, because the plugging material contained at least a ceramic material, a liquid component, and an agglomeration-preventing agent, voids were able to be suppressed in the plugs to a practically harmless extent, thereby providing a good honeycomb filter with plugs at positions separate from the flow path end surface.

EXAMPLES 4-20, AND COMPARATIVE EXAMPLES 1-3

Each honeycomb filter was produced by the following steps. Kaolin powder, talc powder, silica powder and alumina powder were mixed at proportions of 50% by mass of $SiO_2$, 35% by mass of $Al_2O_3$, and 15% by mass of MgO, to prepare cordierite-forming material powder. After this was mixed with methylcellulose and hydroxypropylmethylcellulose as binders, and graphite as a lubricant/pore-forming agent, and fully dry-blended, a predetermined amount of water was added. Sufficient kneading was conducted to prepare a plasticized, moldable ceramic material. The moldable material was extruded through an extrusion die, and cut to provide an extrudate having a honeycomb shape. This extrudate was dried and sintered to provide a cordierite honeycomb structure 11 of 280 mm in outer diameter and 310 mm in length shown in FIG. 2(a), whose cell walls had a thickness of 0.32 mm, a porosity of 64%, an average pore size of 22 μm, and a pitch of 1.6 mm.

As shown in FIG. 2(b), an end surface of the honeycomb structure 11 was placed in a plugging-material-supplying apparatus 20, such that the flow path direction was substantially aligned with the gravity direction. Each tubular member for supplying the plugging material was as long as 100 mm and a circular-cross-sectioned, having an outer diameter, an inner diameter, an outer diameter/opening size ratio, and a tip end shape shown in Table 1. A ceramic material having the average particle size and the maximum particle size shown in Table 1, a liquid component, and an agglomeration-preventing agent were blended at pressure of 50 kPa to produce a plugging material, which was charged into a plugging material tank 21.

The tubular member 30 was inserted into a flow path to be plugged to a position of 30 mm from the end surface 7 of the honeycomb structure 11, and the plugging material tank 21 was pressurized by air supplied through an air-supplying valve 22 to inject a predetermined amount of the plugging material into the flow path through the tubular member, while moving the tubular member in an opposite direction to the gravity direction. After the injection of the plugging material was completed, the tubular member was withdrawn from the flow path, resulting in plugs of 10 mm in length. Plugging was similarly conducted to other flow paths. The resultant honeycomb structure was then placed upside down with another end surface 8 upward, and the tubular member 30 was inserted into a flow path to be plugged to a position of 10 mm from the end surface 8 of the honeycomb structure 11. While injecting a predetermined amount of the plugging material from the tubular member into the flow path, the tubular member was moved in an opposite direction to the gravity direction, thereby forming plugs on the side of the end surface 8. Plugging was similarly conducted to other flow paths. After the plugs were dried, sintering was conducted to produce the honeycomb filter 10. The end surfaces 7 and 8 of the honeycomb structure filter 11 were ground by about 1 mm.

The resultant honeycomb filters were evaluated with respect to the formation of plugs as follows:

(a) Evaluation of Evaluation of Cell Walls

Good: Cell walls were not broken (passed).

Fair: Cell walls were broken to a practically harmless extent (accepted).

Poor: Cell walls were broken (failed).

(b) Evaluation of Conditions of Plugs Formed

Good: Plugs of the predetermined length were formed (passed).

Fair: Plugs of the predetermined length were not formed, but causing no practical problems (accepted).

Poor: Plugs of the predetermined length were not formed, causing practical problems (failed).

(c) Evaluation of Voids in Plugs

Good: Voids were not generated in the plugs (passed).

Fair: Voids were generated in the plugs, but causing no practical problems (accepted).

Poor: Voids were generated in the plugs, and causing practical problems (failed).

(d) Overall Evaluation

Good: Any evaluation of the breakage of cell walls, the conditions of plugs formed, and voids in the plugs was good.

Fair: One or more of the above evaluations was fair.

Poor: At least one of the above evaluations was poor.

These results are shown in Table 1.

TABLE 1

Figure 6A:
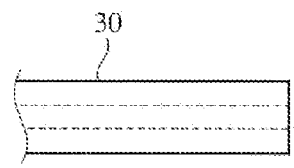
FIG. 6(a) is a view showing a tip end shape of a tubular member, which is not rounded nor tapered.
Figure 6B:
FIG. 6(b) is a view showing a tubular member having a rounded tip end.
Figure 6C:
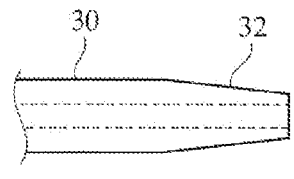
FIG. 6(c) is a view showing a tubular member having a tapered tip end.
Figure 6D:
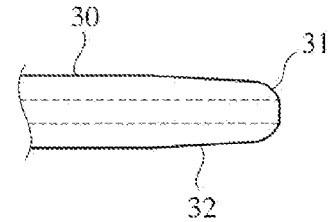
FIG. 6(d) is a view showing a tubular member having a rounded, tapered tip end.

| | Tubular Member | | | |
|---|---|---|---|---|
| No. | Outer Diameter (mm) | Inner Diameter (mm) | Outer Diameter/ Opening Size (%) | Tip End Shape |
| Example 4 | 1.0 | 0.7 | 83 | FIG. 6(a) |
| Example 5 | 1.0 | 0.7 | 83 | FIG. 6(b) |
| Example 6 | 1.0 | 0.7 | 83 | FIG. 6(c) |
| Example 7 | 1.0 | 0.7 | 83 | FIG. 6(d) |
| Example 8 | 1.0 | 0.7 | 83 | FIG. 6(d) |
| Example 9 | 0.8 | 0.5 | 67 | FIG. 6(a) |
| Example 10 | 0.8 | 0.5 | 67 | FIG. 6(a) |
| Example 11 | 0.8 | 0.5 | 67 | FIG. 6(b) |
| Example 12 | 0.8 | 0.5 | 67 | FIG. 6(b) |
| Example 13 | 0.8 | 0.5 | 67 | FIG. 6(c) |
| Example 14 | 0.8 | 0.5 | 67 | FIG. 6(c) |
| Example 15 | 0.8 | 0.5 | 67 | FIG. 6(d) |
| Example 16 | 0.5 | 0.3 | 42 | FIG. 6(d) |
| Example 17 | 0.5 | 0.3 | 42 | FIG. 6(a) |
| Example 18 | 0.5 | 0.3 | 42 | FIG. 6(b) |
| Example 19 | 0.5 | 0.3 | 42 | FIG. 6(c) |
| Example 20 | 0.5 | 0.3 | 42 | FIG. 6(d) |
| Comparative Example 1 | 1.1 | 0.8 | 92 | FIG. 6(a) |
| Comparative Example 2 | 0.4 | 0.2 | 33 | FIG. 6(a) |
| Comparative Example 3 | 0.4 | 0.2 | 33 | FIG. 6(a) |

| | Plugging Material Ceramic Material | | | |
|---|---|---|---|---|
| No. | Material | Average Particle Size (μm) | Maximum Particle Size (μm) | Maximum Particle Size/Inner Diameter of Tubular Member (%) |
| Example 4 | Cordierite | 20 | 300 | 43 |
| Example 5 | Cordierite | 15 | 200 | 29 |
| Example 6 | Cordierite | 10 | 100 | 14 |
| Example 7 | Alumina | 20 | 300 | 43 |
| Example 8 | Alumina | 15 | 200 | 29 |
| Example 9 | Cordierite-Forming Material[(1)] | 20 | 300 | 60 |
| Example 10 | Cordierite-Forming Material[(1)] | 15 | 200 | 40 |
| Example 11 | Cordierite-Forming Material[(1)] | 10 | 100 | 20 |
| Example 12 | Alumina | 20 | 300 | 60 |
| Example 13 | Alumina | 15 | 200 | 40 |
| Example 14 | Aluminum Titanate | 20 | 300 | 60 |
| Example 15 | Aluminum Titanate | 15 | 200 | 40 |
| Example 16 | Cordierite | 15 | 200 | 67 |
| Example 17 | Cordierite | 10 | 100 | 33 |
| Example 18 | Cordierite | 5 | 70 | 23 |
| Example 19 | Alumina | 15 | 200 | 67 |
| Example 20 | Alumina | 10 | 100 | 33 |
| Comparative Example 1 | Alumina | 30 | 700 | 88 |
| Comparative Example 2 | Alumina | 10 | 180 | 90 |
| Comparative Example 3 | Alumina | 0.8 | 100 | 50 |

| | Plugging Material | | | |
|---|---|---|---|---|
| | Liquid Component | | Agglomeration-Preventing Agent | |
| No. | Type | Amount[(2)] (%) | Type | Amount[(2)] (%) |
| Example 4 | Water | 30 | Ammonium Polycarbonate | 7 |
| Example 5 | Water | 30 | Ammonium Polycarbonate | 7 |
| Example 6 | Water | 50 | Ammonium Polycarbonate | 3 |
| Example 7 | Water | 70 | Water glass | 7 |
| Example 8 | Alcohol | 30 | Ammonium Polycarbonate | 2 |
| Example 9 | Water | 30 | Ammonium Polycarbonate | 2 |
| Example 10 | Water | 30 | Ammonium Polycarbonate | 2 |
| Example 11 | Water | 50 | Water glass | 5 |
| Example 12 | Water | 50 | Ammonium Polycarbonate | 3 |
| Example 13 | Water | 50 | Ammonium Polycarbonate | 5 |
| Example 14 | Water | 70 | Ammonium Polycarbonate | 7 |
| Example 15 | Alcohol | 30 | Ammonium Polycarbonate | 7 |
| Example 16 | Water | 30 | Ammonium Polycarbonate | 7 |
| Example 17 | Water | 50 | Water glass | 3 |
| Example 18 | Water | 50 | Ammonium Polycarbonate | 3 |
| Example 19 | Water | 70 | Ammonium Polycarbonate | 7 |
| Example 20 | Alcohol | 30 | Ammonium Polycarbonate | 7 |
| Comparative Example 1 | Water | 30 | — | — |
| Comparative Example 2 | Water | 30 | — | — |
| Comparative Example 3 | Water | 30 | — | — |

| | Evaluation | | | |
|---|---|---|---|---|
| No. | Breakage of Cell Walls | Conditions of Plugs Formed | Voids in Plugs | Overall |
| Example 4 | Fair | Fair | Good | Fair |
| Example 5 | Fair | Fair | Good | Fair |
| Example 6 | Fair | Good | Good | Fair |
| Example 7 | Fair | Good | Fair | Fair |
| Example 8 | Fair | Fair | Good | Fair |
| Example 9 | Good | Fair | Good | Fair |

TABLE 1-continued

| | | | | |
|---|---|---|---|---|
| Example 10 | Good | Fair | Good | Fair |
| Example 11 | Good | Good | Good | Good |
| Example 12 | Good | Good | Good | Good |
| Example 13 | Good | Good | Good | Good |
| Example 14 | Good | Good | Fair | Fair |
| Example 15 | Good | Fair | Good | Fair |
| Example 16 | Good | Fair | Good | Fair |
| Example 17 | Good | Good | Good | Good |
| Example 18 | Good | Good | Good | Good |
| Example 19 | Good | Fair | Fair | Fair |
| Example 20 | Good | Fair | Good | Fair |
| Comparative Example 1 | Poor | Poor | Poor | Poor |
| Comparative Example 2 | Good | Poor | Poor | Poor |
| Comparative Example 3 | Good | Poor | Poor | Poor |

[1]A mixture of kaolin powder, talc powder, silica powder, alumina powder and aluminum hydroxide powder.
[2]Amount per 100% by mass of the ceramic material.

In the production methods of Examples 4-20, the outer diameter of the tubular member for plugging was 40-90% of the opening size of the flow path of the honeycomb structure, the maximum particle size of the ceramic material was 85% or less of the inner diameter of the tubular member, the average particle size of the plugging ceramic material was 1 µm or more, and the plugging material contained a ceramic material, a liquid component and an agglomeration-preventing agent. Because of these facts, honeycomb filters with plugs at positions separate from the flow path end surface were obtained, while preventing the cell walls from being broken by contact of the tubular member with the cell walls when the tubular member was inserted into the flow path, while avoiding the tubular member from being clogged with the plugging material, and while suppressing the generation of voids to a practically harmless extent.

In the production methods of Comparative Examples 1-3, any one of the following conditions was met: the outer diameter of the tubular member for plugging was outside the range of 40-90% of the opening size of the flow path of the honeycomb structure, the maximum particle size of the ceramic material was more than 85% of the inner diameter of the tubular member, the average particle size of the plugging ceramic material was less than 1 µm, and the plugging material did not contain an agglomeration-preventing agent. Accordingly, when the tubular member was inserted into the flow path, the tubular member came into contact with the cell walls, thereby breaking the cell walls. The tubular member was clogged with the plugging material, failing to form good plugs. And voids were generated in the plugs. As a result, good honeycomb filters were not obtained.

EXAMPLE 21

A honeycomb filter was produced in the same manner as in Example 11, except that a reinforcer was formed in the flow path by the length of 10 mm from the end surface 7 of the honeycomb structure 11 before forming the plugs. The reinforcer was formed by immersing the end portion of the honeycomb structure in a molten wax so that the wax was introduced into the pores of the porous cell walls, taking the honeycomb structure out of the molten wax, and then cooling it. The reinforcing wax was molten and burned off during temperature elevation to sinter the plugs. Because the cell walls in the flow path end portions were reinforced by the wax in the production method of Example 21, the cell walls were not broken when the tubular member inserted into the flow path came into contact with the cell walls. Accordingly, a honeycomb filter with good plugs was obtained.

EXAMPLE 22

A honeycomb filter was produced in the same manner as in Example 12, except that a 5-mm-thick polyethylene film was attached to the end surface 7 of the honeycomb structure 11 before forming the plugs, that apertures of 0.9 mm were formed in the film at positions corresponding to the flow paths to be plugged by a laser, and that the tubular member was inserted into each aperture of this film attached to the end surface 7. This film was peeled from the honeycomb structure after forming the plugs and before sintering. Because the tubular member was inserted into the aperture of the film attached to the flow path end surface in the production method of Example 22, the film acted as a guide for the tubular member to be smoothly inserted into the flow path, making it less likely for the tubular member to come into contact with the cell walls, and thus avoiding the cell walls from being broken. Accordingly, a honeycomb filter with good plugs was not obtained.

EXAMPLE 23

As shown in FIG. 11, a honeycomb filter was produced under the same conditions as in Example 13, except that five tubular members were arranged with a 3.2-mm pitch. The method of Example 23 produced a honeycomb filter with good plugs free from broken cell walls and voids, and drastically shortened the plug-forming time.

EXAMPLE 24

A honeycomb filter was produced under the same conditions as in Example 13, except that the positions of the tubular member inserted into the flow path to be plugged were arbitrarily changed from flow path to flow path. As shown in FIG. 9(c), the honeycomb filter of Example 24 had good plugs with non-uniform distances from the end surface 7, without broken cell walls. Because boundaries between the plugs formed in the flow paths and the cell walls were not aligned linearly, the honeycomb filter had excellent heat shock resistance and melting resistance.

EXAMPLE 25

A honeycomb filter was produced under the same conditions as in Example 10, except that the plugging material was caused to pass through a sieve having openings of 200 µm after blending, and that the honeycomb structure 11 was placed such that the flow path direction was substantially horizontal. Because the cordierite-forming material of 200 µm in maximum particle size was caused to pass through a sieve having openings of 200 µm, so that coarse materials were contained in the plugging material, in the production method of the honeycomb filter of Example 25, the clogging of the tubular member with the plugging material was surely prevented.

EXAMPLE 26

Like in Example 4, one end surface 7 of the honeycomb structure 11 was placed in the plugging-material-supplying apparatus 20, such that the flow path direction was substantially aligned with the gravity direction. A tubular member having a circular cross section for supplying the plugging material had a length of 100 mm, an outer diameter of 1.1 mm and an inner diameter of 0.8 mm. A plugging ceramic material was produced by blending 100 parts by mass of cordierite powder having an average particle size of 30 µm and a maximum particle size 700 µm, with 30 parts by mass of water, and 2 parts by mass of ammonium polycarbonate as an agglomeration-preventing agent, and charged into a plugging material tank 21.

Figure 14:
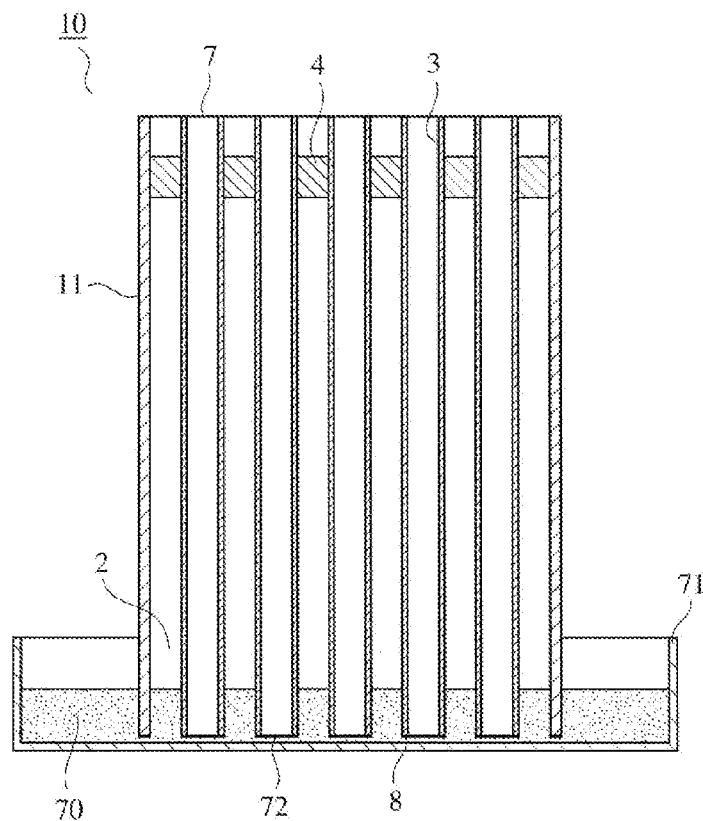
FIG. 14 is a view showing of the method for forming plugs in the other end surface of the honeycomb structure of the present invention.
Figure 15:
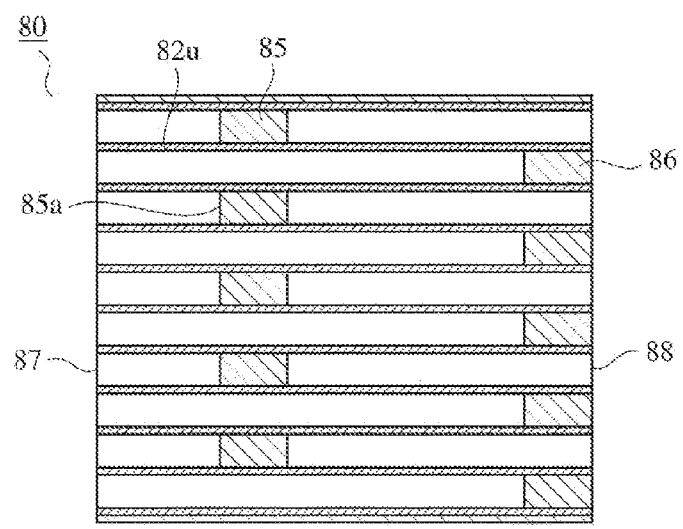
FIG. 15 is a schematic cross-sectional view showing the honeycomb filter described in JP 2004-251266 A.

A tubular member 30 was inserted into a flow path to be plugged to a position of 30 mm from the end surface 7 of the honeycomb structure 11. While pressurizing the plugging material tank 21 through an air-supplying valve 22 to inject a predetermined amount of the plugging material into the flow path through the tubular member, the tubular member was moved in an opposite direction to the gravity direction. After the injection of the plugging material was completed, the tubular member was withdrawn from the flow path, resulting in the plug 4 of 10 mm in length. Plugging was also conducted to other flow paths. As shown in FIG. 14, a film 72 was attached to the other end surface 8 of the honeycomb structure 11, apertures were formed in the film at positions corresponding to flow paths free from the plugs 4, and it was immersed in a second plugging material 70 (produced by mixing 100 parts by mass of cordierite powder with 30 parts by mass of water) in a vessel 71 to form plugs 5. After the plugs were dried, sintering was conducted to produce the honeycomb filter 10.

Because plugs disposed at positions separate from one end surface of the honeycomb structure were formed from the plugging material containing at least a ceramic material, a liquid component and an agglomeration-preventing agent, in the production method of the honeycomb filter of Example 26, the generation of voids in the plugs was suppressed to a practically harmless extent, and the number of steps of forming plugs at the other end surface of the honeycomb structure was reduced.

Although plugging was later conducted using the second plugging material in Example 26, the plugs 4 may be formed using the tubular member 30 in the flow paths at positions separate from the end surface of the honeycomb structure, after forming plugs 5 in the end portion of the honeycomb structure using the second plugging material.

EXAMPLES 27-30 AND COMPARATIVE EXAMPLES 4, 5

Kaolin powder, talc powder, silica powder and alumina powder were mixed at proportions of 50% by mass of $SiO_2$, 35% by mass of $Al_2O_3$, and 15% by mass of MgO to prepare cordierite-forming material powder. After methylcellulose and hydroxypropylmethylcellulose as binders, and an organic foaming agent as a lubricant/pore-forming agent were added and fully dry-blended, water was added, and sufficient kneading was conducted to form a plasticized, moldable ceramic material. The moldable material was extruded through an extrusion die, and cut to an extrudate having a honeycomb shape. This extrudate was dried and sintered to obtain a cordierite honeycomb structure of 267 mm in outer diameter and 305 mm in length, whose cell walls had a thickness of 0.3 mm, a porosity of 65%, an average pore size of 20 µm, and a pitch of 1.5 mm.

As shown in FIG. 2(b), an end surface of the honeycomb structure 11 was placed in a plugging-material-supplying apparatus 20, such that the flow path direction was substantially aligned with the gravity direction. A tubular member for supplying the plugging material 30 was made of stainless steel and had a circular cross section having an outer diameter of 1.1 mm and an inner diameter of 0.8 mm. A plugging material slurry was produced by preparing cordierite-forming material powder A from ceramic material powder of talc, kaolin, silica, alumina and aluminum hydroxide at proportions of 50% by mass of $SiO_2$, 35% by mass of $Al_2O_3$, and 15% by mass of MgO, dry-mixing it with an organic foaming agent and methylcellulose, and then wet-mixing it with ion-exchanged water, and a polycarboxylic acid surfactant as a dispersing agent. The amount of the organic foaming agent was adjusted such that the inlet-side plugs had a porosity shown in Table 2.

The tubular member 30 was inserted into a flow path to be plugged to a position of 120 mm from the end surface 7 of the ceramic honeycomb structure 11, and a predetermined amount of the plugging material slurry was injected from the tubular member into the flow path. Water in the plugging material slurry was absorbed by the porous cell walls, resulting in the solidification of the plugging material. Plugging was similarly conducted to other flow paths, and the resultant plugs were dried. Thereafter, as shown in FIG. 14, a resin film 72 was attached to the exhaust-gas-outlet-side end surface 8, and bored at positions corresponding to the predetermined flow paths. A plugging material slurry comprising the cordierite-forming material and the organic foaming agent was caused to flow into the flow paths from the exhaust-gas-outlet-side end surface 8, to form exhaust-gas-outlet-side plugs. The plugging material was then sintered at 1400° C. in the atmosphere, to produce the honeycomb filters of Examples 27-30 and Comparative Examples 4, 5, in which the plugs were integrally bonded to the cell walls.

A catalytic material comprising Pt, cerium oxide and active alumina was carried by the surfaces and pores of the cell walls and plugs of each honeycomb filter of Examples 27-30 and Comparative Examples 4, 5. The amount of Pt carried was 2 g per 1 L of the honeycomb filter.

Each honeycomb filter of Examples 27-30 and Comparative Examples 4, 5 thus produced was placed in a pressure-loss-measuring apparatus, and air was introduced at a flow rate of 7.5 $Nm^3$/minute to measure pressure difference between the inlet-side end surface and the outlet-side end surface, thereby evaluating the initial pressure loss of each honeycomb filter. Further, each honeycomb filter of Examples 27-30 and Comparative Examples 4, 5 was connected to an exhaust pipe of a diesel engine, to conduct a durability test by a driving pattern simulated to driving in city areas. In this case, a large amount of PM was accumulated in the filter under such a driving condition that the exhaust gas temperature was lower than the lowest activation temperature of the catalytic material. The durability test was conducted by repeating the injection of an unburned fuel into an upstream side of the filter at a time when the amount of PM accumulated in the honeycomb filter was determined to become a predetermined level or more under this driving condition, to conduct the forced regeneration of the filter. The pressure loss of the honeycomb filter after the durability test was measured by the same method as the initial pressure loss, and a pressure loss ratio was calculated by (pressure loss after test)/(initial pressure loss). The results are shown in Table 2.

Each honeycomb filter of Examples 27-30 and Comparative Examples 4, 5 was installed in an exhaust parts test apparatus, and subjected to heat shock 10 times by repeating rapid heating to 600° C. by an LPG burner disposed upstream of the honeycomb filter and rapid cooling to room temperature. The honeycomb filter after the test was cut in a direction perpendicular to the flow path at a position where the inlet-side plugs existed, to confirm cracking in boundaries between the inlet-side plugs and the cell walls. The heat shock resistance was evaluated as follows: The results are shown in Table 2.

Excellent: Not cracked at all.
Good: Slightly cracked to a practically harmless extent.
Poor: So cracked that some inlet-side plugs were detached.

TABLE 2

| No. | Porosity of Cell Walls (%) | Inlet-Side Plugs | | Outlet-Side Plugs | | Evaluation Results | |
|---|---|---|---|---|---|---|---|
| | | Porosity (%) | Length[1] (mm) | Porosity (%) | Length[1] (mm) | Pressure Loss Ratio | Heat Shock Resistance |
| Example 27 | 65 | 30 | 10 | 70 | 12 | 1.01 | Good |
| Example 28 | 65 | 37 | 10 | 70 | 12 | 1.01 | Excellent |
| Example 29 | 65 | 55 | 9 | 70 | 12 | 1.03 | Excellent |
| Example 30 | 65 | 60 | 9 | 70 | 12 | 1.07 | Excellent |
| Comparative Example 4 | 65 | 65 | 10 | 70 | 12 | 1.15 | Excellent |
| Comparative Example 5 | 65 | 70 | 10 | 70 | 12 | 1.21 | Excellent |

Note:
[1]Length in the flow path direction.

The honeycomb filters of Examples 27-30 within the present invention had pressure loss ratios of 1.01-1.07 because their inlet-side plugs had smaller porosity than that of the cell walls, while the honeycomb filters of Comparative Examples 4, 5 had pressure loss ratios of 1.15-1.21, larger than those of Examples 27-30, because their inlet-side plugs had porosity equal to or larger than that of the cell walls. With respect to the heat shock resistance, any honeycomb filters were marked "Good" or "Excellent," but the honeycomb filter of Example 27 had slightly poorer performance because the inlet-side plugs had porosity less than 0.5 times that of the cell walls.

EXAMPLES 31-34

Honeycomb filters were produced by the following steps. Kaolin powder, talc powder, silica powder, alumina powder, and aluminum hydroxide powder were mixed at proportions of 50% by mass of $SiO_2$, 35% by mass of $Al_2O_3$, and 15% by mass of MgO, and methylcellulose, hydroxypropylmethylcellulose, etc. as a binder, and graphite as a lubricant/pore-forming agent were added, and fully dry-blended. With a predetermined amount of water added, sufficient kneading was conducted to form a plasticized, moldable ceramic material. The moldable material was extruded through an extrusion die, and cut to provide an extrudate having a honeycomb shape. This extrudate was dried and sintered, to obtain a cordierite honeycomb structure of 267 mm in outer diameter and 305 mm in length, whose cell walls had a thickness of 0.3 mm, a porosity of 65%, an average pore size of 20 μm, and a pitch of 1.5 mm.

As shown in FIG. 2(b), an end surface of the honeycomb structure 11 was placed in a plugging-material-supplying apparatus 20, such that the flow path direction was substantially aligned with the gravity direction. A tubular member for supplying the plugging material 30 was made of stainless steel and had a circular cross section having a length of 110 mm, an outer diameter of 1.1 mm, and an inner diameter of 0.8 mm. Cordierite-forming material powder A was prepared as ceramic material powder from talc, kaolin, silica, alumina and aluminum hydroxide at proportions of 50% by mass of $SiO_2$, 35% by mass of $Al_2O_3$, and 15% by mass of MgO. 100 parts by mass of the ceramic material powder was dry-mixed with 1 part by mass of methylcellulose, and then wet-mixed with 52-75 parts by mass of ion-exchanged water, and 3 parts by mass of a polycarboxylic acid surfactant as a dispersing agent, to produce a plugging material slurry as shown in Table 3. The particle size of the cordierite-forming material powder A comprising talc, kaolin, silica, alumina and aluminum hydroxide was d10 of 2 μm, d50 of 5.1 μm, and d90 of 23 μm. This plugging material slurry had a viscosity of 21-68 Pa·s.

A tubular member 30 was inserted into a flow path to be plugged to a position of 100 mm from the end surface 7 of the honeycomb structure 11, and a predetermined amount of the plugging material slurry was injected into the flow path from the tubular member. With water in the plugging material slurry absorbed by the porous cell walls, the plugging material was solidified. Plugging was similarly conducted to other flow paths, and the resultant plugs were dried. A known mask film was attached to the exhaust-gas-outlet-side end surface, and bored at positions corresponding to the predetermined flow paths. A plugging slurry of the cordierite-forming material was caused to flow into the flow paths from the exhaust-gas-outlet-side end surface by a known method, to form exhaust-gas-outlet-side plugs. The plugging material was sintered at 1400° C. in the atmosphere to make the plugs integral with the cell walls, thereby producing each honeycomb filter of Examples 31-34.

EXAMPLE 35

A honeycomb filter was produced in the same manner as in Example 33, except for changing the proportion of the binder as shown in Table 3. Because of a smaller percentage of the binder, the viscosity of the plugging material slurry of Example 35 was 25 Pa·s, lower than that of Example 33.

EXAMPLE 36

A honeycomb filter was produced in the same manner as in Example 32 except for using a cordierite-forming material B. The particle size of the cordierite-forming material B was d10 of 1.5 μm, d50 of 6.2 μm, and d90 of 25 μm. With a different particle size distribution of the cordierite-forming material, the viscosity of the plugging material slurry of Example 36 was slightly higher than that of Example 32.

COMPARATIVE EXAMPLE 6

A honeycomb filter was produced in the same manner as in Example 31, except for using a cordierite-forming material C, and decreasing the percentage of ion-exchanged water. The particle size distribution of the cordierite-forming material C was d10 of 4.1 μm, d50 of 7.5 μm, and d90 of 12 μm. With different particle size of the cordierite-forming material and smaller percentage of ion-exchanged water, the viscosity of the plugging material slurry of Comparative Example 1 was 100 Pa·s, higher than that of Example 31.

In each honeycomb filter of Examples 31-36 and Comparative Example 6, a catalytic material comprising Pt, cerium oxide and active alumina was carried by the surfaces and pores of the cell walls and pores. The amount of Pt carried was 2 g per 1 L of the honeycomb filter.

Each honeycomb filter of Examples 31-36 and Comparative Example 6 thus produced was installed in a pressure-loss-measuring apparatus, and air was introduced at a flow rate of 7.5 Nm³/minute to measure pressure difference between the inlet-side end surface and the outlet-side end surface, thereby evaluating the initial pressure loss of each honeycomb filter. Further, each honeycomb filter of Examples 31-36 and Comparative Example 6 was connected to an exhaust pipe of a diesel engine, to conduct a durability test by a driving pattern simulated to driving in city areas. In this case, PM was accumulated in the filter under such a driving condition that the exhaust gas temperature was lower than the lowest activation temperature of the catalytic material. The durability test was conducted by injecting a large amount of an unburned fuel into an upstream side of the filter at a time when the amount of PM accumulated in the honeycomb filter was determined to become a predetermined level or more under this driving condition, to conduct the forced regeneration of the filter. The pressure loss of the honeycomb filter after the time corresponding to 10,000-km driving passed was measured by the same method as the initial pressure loss, and a pressure loss ratio was calculated by (pressure loss after test)/(initial pressure loss). Each honeycomb filter was also disposed in a pressure-loss-measuring apparatus, and 3 g/hr of carbon having a particle size of 0.042 μm was injected at a flow rate of 7.5 Nm³/minute for 2 hours. A ratio of the amount of carbon captured in the honeycomb filter to the amount of carbon injected was calculated as carbon-capturing efficiency at 10,000-km driving. These test results are shown in Table 4.

Each honeycomb filter after the test was cut to observe near the exhaust-gas-inlet-side plugs. The following evaluation was conducted. The results are shown in Table 4.

Good: Not broken at all (passed).

Fair: Slightly cracked to a practically harmless extent (accepted).

Poor: Broken to a practically harmful extent (failed).

The thickness L and recess depth A of inlet-side plugs at arbitrary 10 points were measured and averaged. The results are shown in Table 4.

In the honeycomb filters of Examples 31-36 produced by using the predetermined plugging material slurry, recesses were formed on both end surfaces of the exhaust-gas-inlet-side plugs. Accordingly, the breakage of the inlet-side plugs, if any, was to a practically harmless extent in the durability test, and the pressure loss and the capturing efficiency were on satisfactory levels after the durability test. Among others, the honeycomb filters of Examples 32-36 with a large recess depth were free from breakage in the inlet-side plugs. On the other hand, the honeycomb filter of Comparative Example 6 having projections on both end surfaces of the exhaust-gas-inlet-side plugs was broken in some inlet-side plugs, resulting in as low capturing efficiency as less than 90%, despite low pressure loss after the durability test.

TABLE 3

Formulation Of Plugging Material Slurry

| No. | Ceramic Material Powder Cordierite-Forming Material) Type | Parts By Mass | Ion-Exchanged Water Parts By Mass | Methyl-Cellulose Binder Parts By Mass | Viscosity Of Plugging Material Slurry (Pa · s) |
|---|---|---|---|---|---|
| Example 31 | A | 100 | 52.3 | 1.0 | 68 |
| Example 32 | A | 100 | 58.5 | 1.0 | 50 |
| Example 33 | A | 100 | 65.0 | 1.0 | 35 |
| Example 34 | A | 100 | 75.0 | 1.0 | 21 |
| Example 35 | A | 100 | 65.0 | 0.5 | 25 |
| Example 36 | B | 100 | 58.5 | 1.0 | 52 |
| Comparative Example 6 | C | 100 | 30.0 | 1.0 | 100 |

TABLE 4

| No. | Evaluation | | | Inlet-Side Plugs | |
|---|---|---|---|---|---|
| | Pressure Loss Ratio | Capturing Efficiency (%) | Shape Of End Surface | Breakage | Thickness L (mm) | Recess Depth A (mm) |
| Example 31 | 1.1 | 93 | Recessed | Fair | 10.3 | 0.3 |
| Example 32 | 1.1 | 95 | Recessed | Good | 10.2 | 0.8 |
| Example 33 | 1.1 | 96 | Recessed | Good | 10.1 | 2.3 |
| Example 34 | 1.1 | 98 | Recessed | Good | 10.3 | 3.5 |
| Example 35 | 1.1 | 96 | Recessed | Good | 10.3 | 1.8 |
| Example 36 | 1.1 | 96 | Recessed | Good | 11.8 | 1.2 |
| Comparative Example 6 | 0.9 | 88 | Projected | Poor | 10.2 | −0.8 |

EXAMPLES 37-43 AND COMPARATIVE EXAMPLES 7-9

Using powder of kaolin, talc, silica, aluminum hydroxide, alumina, etc., cordierite-forming material powder comprising 47-53% by mass of $SiO_2$, 32-38% by mass of $Al_2O_3$, 12-16% by mass of MgO, and 2.5% by mass or less in total of inevitably introduced components such as CaO, $Na_2O$, $K_2O$, $TiO_2$, $Fe_2O_3$, PbO, $P_2O_5$, etc. was prepared, and sufficiently mixed with a molding aid, a pore-forming agent, and a predetermined amount of water, to prepare a material extrusion-moldable to a honeycomb shape. The moldable material was extruded through a known extrusion die, to form a honeycomb extrudate having a peripheral wall, and square-cross-sectioned flow paths partitioned by cell walls inside the peripheral wall. After drying, sintering was conducted to produce a cordierite honeycomb structure of 267 mm in outer diameter and 300 mm in length having about 25,000 flow paths, whose cell walls had a thickness of 0.3 mm, a pitch of 1.57 mm, a porosity of 65%, and an average pore size of 20 μm.

As shown in FIG. 2(b), an end surface of the honeycomb structure 11 was placed in a plugging-material-supplying apparatus 20, such that the flow path direction was substantially aligned with the gravity direction. A tubular member for supplying the plugging material 30 was made of stainless steel and had a circular cross section having an outer diameter of 1.1 mm and an inner diameter of 0.8 mm. The plugging material was produced by blending 100 parts by mass of cordierite powder having an average particle size of 16 μm and a maximum particle size of 270 μm as a ceramic material, with 30 parts by mass of water.

The tubular member 30 was inserted into a flow path to be plugged to a position of 120 mm from the end surface 7 of the ceramic honeycomb structure 11, and a predetermined amount of the plugging material slurry was injected into the flow path from the tubular member. With water in the plugging material slurry absorbed by the porous cell walls, the plugging material was solidified. Plugging was similarly conducted to other flow paths to have a ratio R1/R of the flow paths 9b with no plugs 4 (shown in FIG. 18) shown in Table 5. For instance, plugging was not conducted in 12 flow paths in Comparative Example 40 having R1/R of 0.1%. The flow paths 9b with no plugs 4 were not adjacent to each other.

Figure 18:
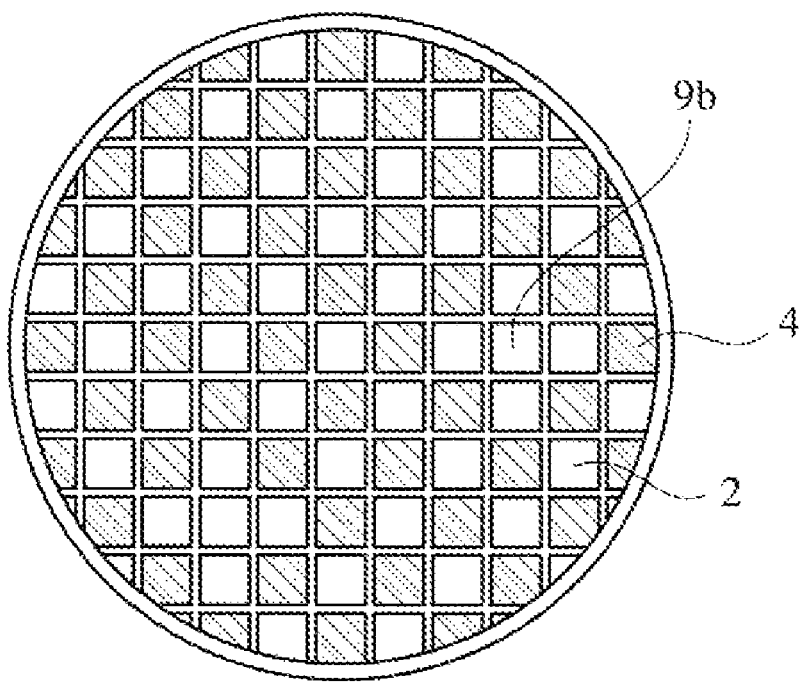
FIG. 18 is a cross-sectional view showing one example of the honeycomb filter of the present invention, which has flow paths with no plugs.

A resin mask film 72 was attached to the outlet-side end surface 8 of the honeycomb structure as shown in FIG. 14, and bored by a laser in such a checkerboard pattern that all flow paths to be plugged were open. The outlet-side end surface 8 of the honeycomb structure was immersed in a second plugging material slurry 70 prepared by blending 100 parts by mass of cordierite powder with 30 parts by mass of water, and the plugging material was charged into the flow paths 3 through film apertures. After the plugging material was adhered to the cell walls and solidified to have sustainability, the mask film was removed, and the plugging material was dried. The honeycomb structure as well as the plugging material were sintered in a batch-type furnace with its temperature controlled, to produce a honeycomb filter having flow paths 9b without plugs 4 as shown in FIG. 18.

With respect to each honeycomb filter of Examples 37-43 and Comparative Examples 7-9, the size L1 between the inlet-side end surface 7 and the inlet-side end surface of the inlet-side plugs 4 was measured. As a result, L1/L, wherein L is the length of the honeycomb structure, was 0.41 in all samples. L1 was measured by inserting a metal rod of about 0.8 mm in diameter and 200 mm in length into each of 20 flow paths in one honeycomb filter, and averaged. Also, in the honeycomb filters of Examples 37-43 and Comparative Examples 7-9, the ratio R1/R, wherein R is the number of flow paths with plugs 4, and R1 is the number of flow paths without plugs 4, was determined by image analysis.

Each honeycomb filter of Examples 37-43 and Comparative Examples 7-9 was installed in a pressure-loss-measuring apparatus, and air was introduced into the honeycomb filter at a flow rate of 7.5 Nm³/minute to measure pressure difference between the inlet-side end surface 7 and the outlet-side end surface 8, thereby evaluating the initial pressure loss. Assuming that the initial pressure loss of the honeycomb filter of Comparative Example 7 having inlet-side plugs 4 in all flow paths is 1, the initial pressure loss in Examples 37-43 and Comparative Examples 8, 9 is shown by a relative value.

Using a PM-capturing efficiency test apparatus, a large amount of PM was charged into each honeycomb filter of Example 37-43 and Comparative Examples 7-9, to measure the amount of PM exiting from the honeycomb filter. The PM-capturing efficiency was evaluated by the following standard.

Good: Passed.
Poor: Failed.

Each honeycomb filter of Examples 37-43 and Comparative Examples 7-9 was subjected to a heat cycle test comprising heating to 600° C. and cooling to room temperature 1,000 times. After the heat cycle test, cracking in the plugs 4 and nearby was observed to evaluate cracking resistance by the following standard.

Excellent: Not cracked at all, and it is expected to prevent breakage of plugs 4 and cell walls 3.
Good: Slightly cracked, but it is expected to prevent breakage of plugs 4 and cell walls 3.
Fair: Small cracks appeared, and it is expected that they lead to the breakage of plugs 4 or cell walls 3.
Poor: Large cracks appeared, and it is expected that plugs 4 and cell walls 3 are broken.

Referring to the initial pressure loss and the cracking resistance, overall evaluation was conducted.

The evaluation of the initial pressure loss, the PM-capturing efficiency and the cracking resistance, and the overall evaluation are shown in Table 5.

TABLE 5

| No. | R1/R (%) | Initial Pressure Loss | Capturing Efficiency | Cracking Resistance | Overall Evaluation |
| --- | --- | --- | --- | --- | --- |
| Comparative Example 7 | 0 | 1.0 | Good | Poor | Poor |
| Comparative Example 8 | 0.02 | 0.9 | Good | Fair | Fair |
| Example 37 | 0.03 | 0.8 | Good | Good | Good |
| Example 38 | 0.04 | 0.8 | Good | Excellent | Excellent |
| Example 39 | 0.07 | 0.8 | Good | Excellent | Excellent |
| Example 40 | 0.1 | 0.7 | Good | Excellent | Excellent |
| Example 41 | 0.5 | 0.7 | Good | Excellent | Excellent |
| Example 42 | 0.8 | 0.7 | Good | Excellent | Excellent |
| Example 43 | 1.5 | 0.6 | Good | Excellent | Good |
| Comparative Example 9 | 1.7 | 0.6 | Poor | Excellent | Poor |

It is clear from Table 5 that the honeycomb filter of Examples 37-43 and Comparative Example 7, 8 had small initial pressure loss while keeping high capturing efficiency. Examples 37-43 had R1/R of 0.03-1.5%, particularly Examples 38-42 had R1/R of 0.04-0.8%, they were highly evaluated in the initial pressure loss, the capturing efficiency, and the cracking resistance of plugs 4 and cell walls 3, thus their overall evaluation being high. On the other hand, Comparative Example 7 having plugs 4 in all flow paths, and Comparative Example 8 having R1/R of 0.02% had low cracking resistance. Comparative Example 9 having R1/R exceeding 1.5% failed to keep the capturing efficiency.

EFFECT OF THE INVENTION

The method of the present invention for producing a honeycomb filter can surely form plugs at positions separate from the end surface. Particularly, in the method of forming plugs in flow paths at positions separate from the end surface, using a plugging-material-injecting device having a tubular member of the predetermined length, the breakage of cell walls can be prevented, while avoiding the clogging of the tubular member with the plugging material. Further, the generation of voids in the plugs can be prevented. It is possible to obtain a honeycomb filter with plugs at positions separate from the end surface, which was not achieved by conventional methods. It is further possible to obtain a honeycomb filter with plugs at uniform or non-uniform distances from the end surface, and a honeycomb filter with pluralities of plugs in the same flow paths.

What is claimed is:

1. A method for producing a honeycomb filter from a honeycomb structure having large numbers of flow paths partitioned by cell walls, comprising inserting a tubular member into each of said flow paths, and injecting a plugging material into each of said flow paths from said tubular member to form a plug in each of said flow paths at a position separate from an end surface of said honeycomb structure, said tubular member having an outer diameter that is 40-90% of the opening size of said flow paths, said plugging material comprising at least a ceramic material having a maximum particle size that is 85% or less of the inner diameter of said tubular member, and an average particle size of 1 µm or more, wherein after said plugging material is injected, the end surface of the honeycomb structure, through which said tubular member is inserted, is removed by machining.

2. The method for producing a honeycomb filter according to claim 1, wherein said plugging material comprises 100 parts by mass of a ceramic material, 10-70 parts by mass of a liquid component, and 0.01-10 parts by mass of an agglomeration-preventing agent.

3. The method for producing a honeycomb filter according to claim 1, wherein said plugging material is blended, and then caused to pass through a sieve having openings of 200 µm or less.

4. The method for producing a honeycomb filter according to claim 1, wherein said tubular member has a rounded tip end.

5. The method for producing a honeycomb filter according to claim 1, wherein said tubular member has a tapered tip end.

6. The method for producing a honeycomb filter according to claim 1, wherein said plugging material is blended at pressure lower than atmospheric pressure.

7. The method for producing a honeycomb filter according to claim 1, wherein while injecting said plugging material, said tubular member is moved substantially in a flow path direction.

8. The method for producing a honeycomb filter according to claim 1, wherein pluralities of tubular members are arranged at the same interval as that of the flow paths to be plugged in said honeycomb structure.

9. The method for producing a honeycomb filter according to claim 1, wherein a guide having apertures, through which said tubular member can pass, is attached to the flow path end surface of said honeycomb structure, wherein said tubular member is inserted into said flow path through said guide, and wherein a plugging material is injected from said tubular member to form plugs.

10. The method for producing a honeycomb filter according to claim 1, wherein a tubular member is inserted into each of said flow paths to inject a plugging material at one end of said honeycomb structure, thereby forming a plug in each of said flow paths at a position separate from said one end surface of said honeycomb structure, and wherein an other end surface of said honeycomb structure is immersed in a second plugging material to form plugs in the other end portion of said honeycomb structure.

11. A honeycomb filter comprising a porous ceramic honeycomb structure, desired flow paths of which are plugged such that an exhaust gas passes through cell walls of the honeycomb structure, wherein said porous ceramic honeycomb structure has exhaust-gas-inlet-side plugs separate from an exhaust-gas-inlet-side end surface and exhaust-gas-outlet side plugs at an exhaust-gas-outlet-side end surface, wherein the porosity of said cell walls is 40-80%, wherein the porosity of said exhaust-gas-inlet-side plugs is 0.5-0.9 times that of said cell walls, and the porosity of said exhaust-gas-outlet-side plugs is 90% or less, and 1.1-1.5 times that of said cell walls, and wherein both end surfaces of said exhaust-gas-inlet-side plugs are recessed more than 50% of an opening diameter of the flow path in the flow path direction relative to a hypothetical straight line connecting contact points of the plugs and the cell walls.

12. A honeycomb filter comprising a porous ceramic honeycomb structure, desired flow paths of which are plugged such that an exhaust gas passes through cell walls of the honeycomb structure, wherein said porous ceramic honeycomb structure has exhaust-gas-inlet side plugs separate from an exhaust-gas-inlet-side end surface and exhaust-gas-outlet side plugs at an exhaust-gas-outlet-side end surface, wherein the porosity of said cell walls is 40-80%, wherein the porosity of said exhaust-gas-inlet-side plugs is 0.5-0.9 times that of said cell walls, and the porosity of said exhaust-gas-outlet-side plugs is 90% or less, and 1.1-1.5 times that of said cell walls, wherein a percentage of flow paths without plugs is 0.04-0.8% of flow paths having plugs on the exhaust-gas-inlet-side and the exhaust-gas-outlet-side, and wherein said flow paths without plugs are not adjacent to each other.

13. A method for producing a honeycomb filter from a honeycomb structure having large numbers of flow paths partitioned by cell walls, comprising inserting a tubular member into each of said flow paths, and injecting a plugging material into each of said flow paths from said tubular member to form a plug in each of said flow paths at a position separate from an end surface of said honeycomb structure, said tubular member having an outer diameter that is 40-90% of the opening size of said flow paths, said plugging material comprising at least a ceramic material having a maximum particle size that is 85% or less of the inner diameter of said tubular member, and an average particle size of 1 µm or more, wherein before said plugging material is injected, a reinforcer is formed in at least part of cell walls in the flow path end portions of the honeycomb structure, into which said tubular member is inserted, and burned off during a sintering of the plugs (or temperature elevation to sinter the plugs).

* * * * *